(12) United States Patent
Perkins et al.

(10) Patent No.: US 10,862,782 B2
(45) Date of Patent: Dec. 8, 2020

(54) APPLICATION IDENTIFICATION USING NETWORK TRAFFIC

(71) Applicant: Oath Inc., New York, NY (US)

(72) Inventors: Kevin Andrew Perkins, Champaign, IL (US); Mithilesh Nanjamanaidu Sriniva, Champaign, IL (US); Aaron John Klish, Savoy, IL (US); Matthew Robert Ahrens, Champaign, IL (US)

(73) Assignee: Oath Inc., New York, NY (US)

( * ) Notice: Subject to any disclaimer, the term of this patent is extended or adjusted under 35 U.S.C. 154(b) by 0 days.

(21) Appl. No.: 16/372,854

(22) Filed: Apr. 2, 2019

(65) Prior Publication Data

US 2020/0322240 A1 Oct. 8, 2020

(51) Int. Cl.
| | |
|---|---|
| *H04L 12/26* | (2006.01) |
| *H04L 12/911* | (2013.01) |
| *H04L 29/06* | (2006.01) |
| *H04L 29/08* | (2006.01) |

(52) U.S. Cl.
CPC .............. *H04L 43/08* (2013.01); *H04L 47/82* (2013.01); *H04L 67/42* (2013.01); *H04L 69/329* (2013.01)

(58) Field of Classification Search
None
See application file for complete search history.

(56) References Cited

U.S. PATENT DOCUMENTS 9,853,876 B1 *  12/2017  Ranjan .................... H04L 43/10
2018/0131624 A1 *  5/2018  Samadani ............. H04L 43/026

OTHER PUBLICATIONS

He, et al., "Mobile app identification for encrypted network flows by traffic correlation", https://journals.sagepub.com/doi/pdf/10.1177/1550147718817292, Jan. 16, 2018, International Journal of Distributed Sensor Networks 2018, vol. 14(12), 17 pages.
Xing, et al., "A Brief Survey on Sequence Classification", https://www.cs.sfu.ca/~jpei/publications/Sequence%20Classification.pdf, vol. 12, Issue 1, pp. 9.

* cited by examiner

*Primary Examiner* — Jeffrey R Swearingen
(74) *Attorney, Agent, or Firm* — Cooper Legal Group, LLC

(57) ABSTRACT

One or more computing devices, systems, and/or methods are provided. Activity of one or more client devices may be analyzed to detect one or more sets of network traffic. A set of network traffic may comprise transmission of data by a client device to one or more first hosts and/or reception of data by the client device from one or more second hosts. The one or more sets of network traffic may be analyzed to generate a set of network traffic information associated with a first application. The set of network traffic information may be indicative of a first set of hosts associated with the first application. It may be determined that first network traffic associated with a client device is associated with the first application based upon the first network traffic and the set of network traffic information associated with the first application.

20 Claims, 11 Drawing Sheets

APPLICATION IDENTIFICATION USING NETWORK TRAFFIC

BACKGROUND

A user may interact with one or more applications (e.g., one or more mobile applications), such as a weather application, a game, etc. using a client device. It may be beneficial to identify the one or more applications interacted with using the client device.

SUMMARY

In accordance with the present disclosure, one or more computing devices and/or methods are provided. In an example, activity of one or more client devices may be monitored to detect one or more sets of network traffic. A set of network traffic of the one or more sets of network traffic may comprise transmission of data by a first client device of the one or more client devices to one or more first hosts and/or reception of data by the first client device from one or more second hosts. The one or more sets of network traffic may be analyzed to generate a set of network traffic information associated with a first application. The set of network traffic information may be indicative of a first set of hosts associated with the first application. First network traffic associated with a second client device may be detected. It may be determined that the first network traffic is associated with the first application based upon the first network traffic and/or the set of network traffic information associated with the first application.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
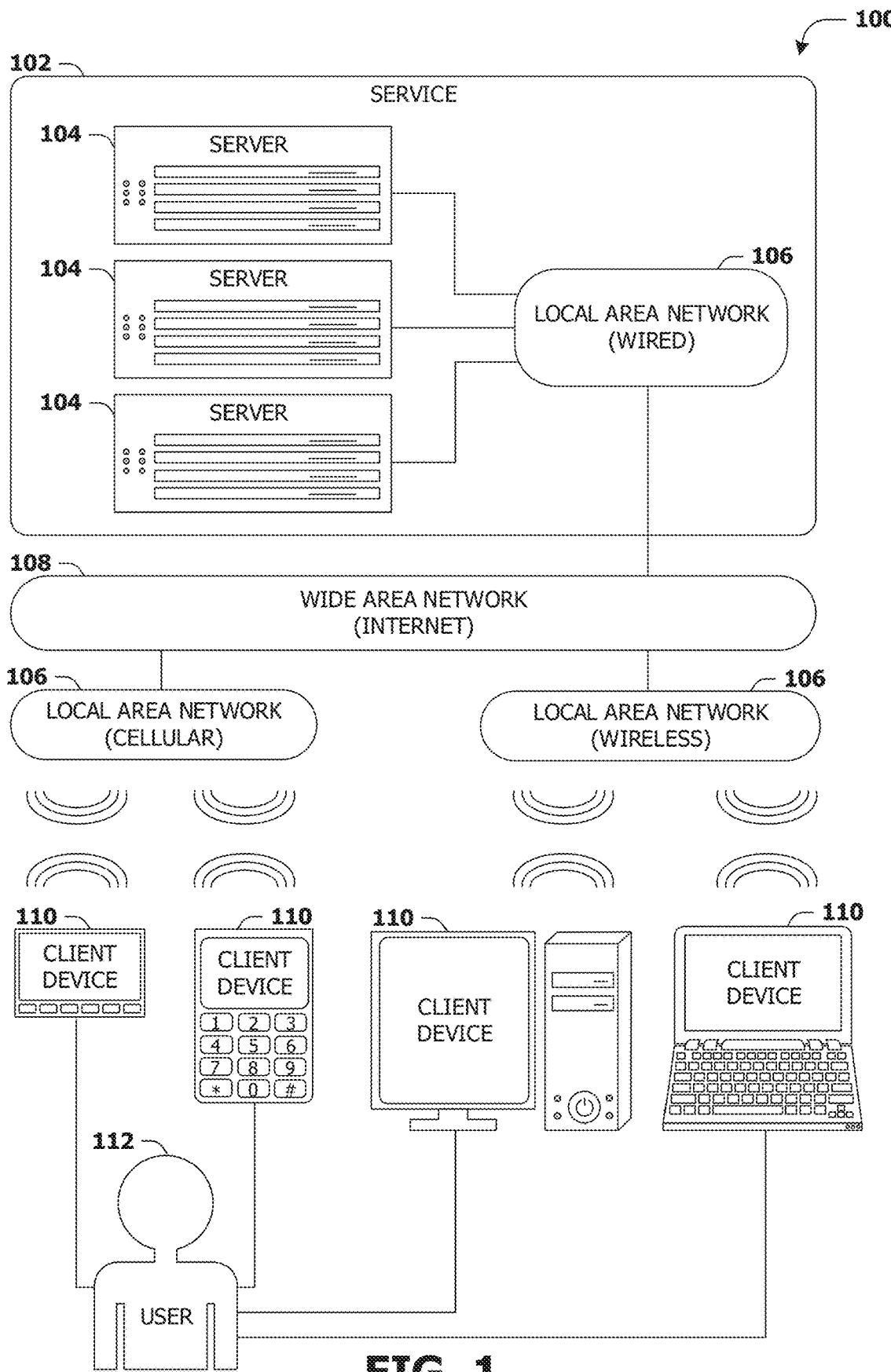
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
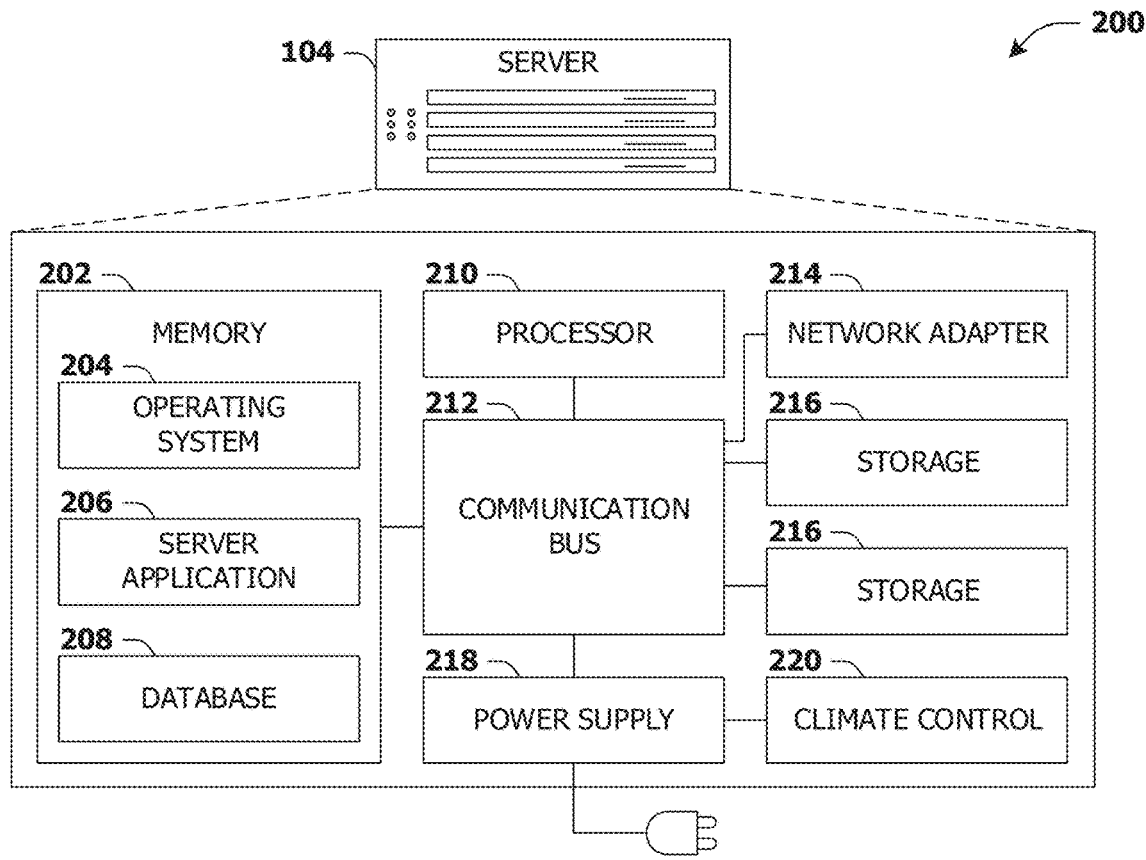
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
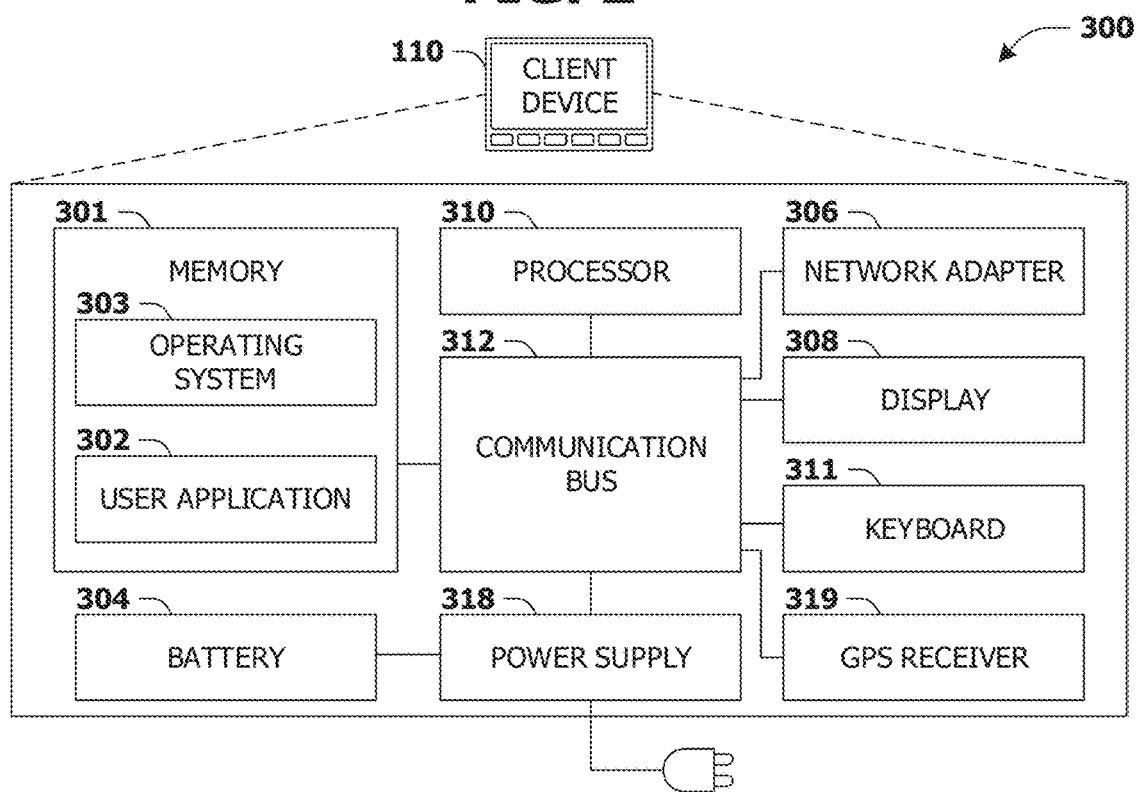
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for determining an application associated with network traffic of a client device are provided. For example, a user (and/or a device associated with the user) may access and/or interact with a first application (e.g., a mobile application), such as a weather application, a news article application, a game application, a communication application, a social media application, an email application, a messaging application, a multimedia application, etc. that provides a platform for uploading content (e.g., videos, blogs, social media posts, etc.) to a server associated with the first application, transmitting content (e.g., emails, messages, etc.) to other client devices, communicating with other users via video calls and/or voice calls, viewing and/or downloading content from the server associated with the first application, playing games, etc.

In some examples, an effort may be made by an application identification system to identify the first application that is accessed and/or interacted with using the device. The application identification system may be associated with an internet service provider (ISP) providing one or more services for the device to access and/or use resources associated with the Internet. The application identification system may analyze first network traffic of the device to determine that the first application is opened, accessed and/or used via the device. In some examples, an indication of the first application may be added to a user profile associated with the user and/or the device. The user profile may be used for one or more of determining user behavior associated with the user and/or other users, selecting content for transmission to the device, etc. In some examples, the user profile may further comprise search history information, website browsing history, email information, user demographic information, location information, etc. For example, the user profile may be used by a content system (associated with the application identification system) to determine interests of the user. For example, the content system may select content for transmission to the device based upon the user profile. However, the first network traffic of the device may be associated with a protocol (e.g., Hypertext Transfer Protocol Secure (HTTPS) and/or one or more different protocols) associated with not including an application name of the first application in the first network traffic (e.g., data associated with the first application transmitted and/or received by the device may be encrypted and/or may not comprise an indication of the application name). In an example, the application name of the first application may be "Weather Forecast Application". However, an indication of the first application and/or the application name may not be included in the first network traffic associated with the first application.

Thus, in accordance with one or more of the techniques presented herein, activity of one or more client devices may be monitored to detect one or more sets of network traffic. For example, a set of network traffic (and/or each set of network traffic) of the one or more sets of network traffic may comprise transmission of data by a client device of the one or more client devices to one or more first hosts and/or reception of data by the client device from one or more second hosts. For example, the one or more first hosts and/or the one or more second hosts may be associated with applications, websites, etc. The one or more sets of network traffic may be analyzed to generate one or more sets of network traffic information associated with one or more applications. For example, a set of hosts of the one or more sets of hosts (and/or each set of hosts of the one or more sets of hosts) may be associated with an application of the one or more applications. In an example, a set of hosts of the one or more sets of hosts associated with an application may be used to provide data to client devices running the application. By using one or more of the techniques presented herein, the first network traffic associated with the device and/or a set of network traffic information (of the one or more sets of network traffic information) associated with the first application may be analyzed to determine that the first network traffic is associated with the first application. For example, the first network traffic may comprise transmission of data to a first host of a first set of hosts (of the one or more sets of hosts) associated with the first application. Alternatively and/or additionally, the first network traffic may comprise reception of data from the first host. It may be determined that the first network traffic is associated with the first application based upon the first host associated with the first network traffic being comprised within the first set of hosts associated with the first application.

Figure 4:
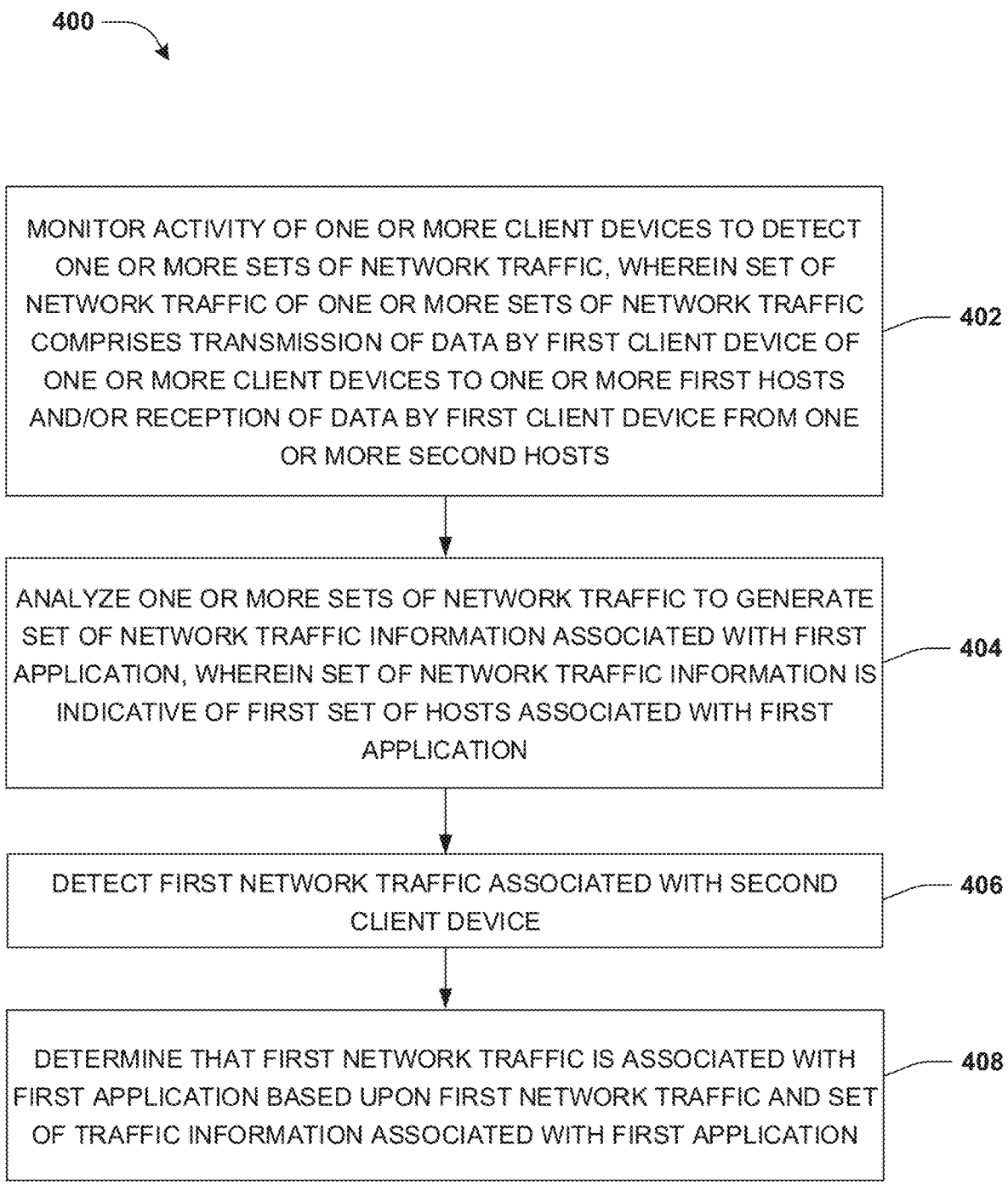
FIG. 4 is a flow chart illustrating an example method for determining an application associated with network traffic of a client device.

An embodiment of determining an application associated with network traffic of a client device is illustrated by an example method 400 of FIG. 4. An application identification system for identifying applications accessed and/or interacted with via client devices may be provided. The application identification system may analyze network traffic associated with client devices to identify applications accessed and/or interacted with via the client devices. For example, the application identification system may be associated with an ISP providing one or more services for the device to access and/or use resources provided by hosts. Alternatively and/or additionally, the application identification system may be associated with a proxy and/or a gateway that receives data (e.g., requests for one or more resources such as a file, a connection, a web page, application information, etc.) and/or transmits the data to intended hosts (e.g., the data may be indicative of the intended hosts). Alternatively and/or additionally, the application identification system may be associated with a packet analyzer (e.g., a packet sniffer) that intercepts and/or logs data transmitted by one or more client devices to hosts and/or received by one or more client devices from hosts.

In some examples, the application identification system may identify a plurality of sets of applications accessed and/or interacted with using a plurality of client devices. A set of applications of the plurality of sets of applications (and/or each set of applications of the plurality of sets of applications) may correspond to one or more applications accessed and/or interacted with using a client device of the plurality of client devices. In some examples, a plurality of user profiles associated with the plurality of client devices may be indicative of the plurality of sets of applications. For example, a first user profile of the plurality of user profiles may be associated with a first client device of the plurality of client devices. The first user profile may be indicative of a first set of applications (e.g., a set of one or more applications) accessed and/or interacted with using the first client device.

In some examples, the plurality of user profiles (and/or the plurality of sets of applications associated with the plurality of user profiles) may be analyzed in order to determine application usage information associated with a plurality of users associated with the plurality of client devices. For example, the plurality of user profiles may be analyzed to determine one or more of one or more rates at which one or more applications are used by client devices per unit of time, one or more proportions of client devices of the plurality of client devices that access and/or interact with one or more applications, etc.

Alternatively and/or additionally, the plurality of user profiles may comprise one or more of user demographic information, location information, etc. associated with the plurality of client devices. For example, the plurality of user profiles may be analyzed to determine one or more of one or more rates at which one or more applications are used by client devices per unit of time by location, age, gender, etc., one or more proportions of client devices of the plurality of client devices that access and/or interact with one or more applications by location, age, gender, etc., etc.

Alternatively and/or additionally, the plurality of user profiles may be updated and/or maintained periodically (e.g., applications may be added to user profiles of the plurality of user profiles, applications that aren't accessed and/or interacted with for a threshold duration of time may be removed from user profiles of the plurality of user profiles, etc.). The plurality of user profiles may be periodically analyzed to determine one or more of changes in rates at which applications are used by client devices over time, changes in proportions of client devices of the plurality of client devices that access and/or interact with applications over time, changes in application preferences among the plurality of users over time, etc.

In some examples, the application usage information may be indicative of one or more popular applications, one or more applications associated with an increasing popularity, etc. Alternatively and/or additionally, new applications may be designed and/or programmed based upon the application usage information. For example, a new application may be designed and/or programmed based upon a popular application such that, similar to the popular application, the new application may attract users. For example, one or more features associated with the one or more popular applications may be identified and/or implemented in the new application (manually and/or automatically).

Alternatively and/or additionally, content may be selected for transmission to client devices of the plurality of client devices based upon the plurality of user profiles (and/or the plurality of sets of applications associated with the plurality of client devices). For example, the application identification system may be associated with a content system for presenting content via client devices. In some examples, the content system may be an advertisement system (e.g., an online advertising system). Alternatively and/or additionally, the content system may provide content items to be presented via pages associated with the content system. For example, the pages may be associated with websites (e.g., websites providing search engines, email services, news content, communication services, etc.) associated with the content system. The content system may provide content items to be presented in (dedicated) locations throughout the pages (e.g., one or more areas of the pages configured for presentation of content items). For example, a content item may be presented at the top of a web page associated with the content system (e.g., within a banner area), at the side of the web page (e.g., within a column), in a pop-up window, overlaying content of the web page, etc. Alternatively and/or additionally, a content item may be presented within an application associated with the content system and/or within a game associated with the content system. Alternatively and/or additionally, a user may be required to watch and/or interact with the content item before the user can access content of a web page, utilize resources of an application and/or play a game.

In some examples, the content system may provide content items for presentation via client devices based upon the plurality of user profiles. In some examples, a user profile of the plurality of user profiles (and/or each user profile of the plurality of user profiles) may comprise activity information associated with a client device of the plurality of client devices. For example, the activity information may be indicative of one or more of a set of applications of the plurality of sets of applications, one or more consumed content items (e.g., an article, a video, an audio file, an image, a web page, an advertisement, an email, a message, etc. consumed by a user), one or more accessed content items (e.g., an article, a video, an audio file, an image, a web page, an advertisement, an email, a message, etc. accessed by a client device), one or more selected content items (e.g., an article, a video, an audio file, an image, a web page, an advertisement, an email, a message, etc. selected via a client device), one or more content item interactions (e.g., an advertisement impression, an advertisement click, a conversion associated with an advertisement, etc.), etc.

In an example, an exemplary request for content associated with an exemplary client device may be received. The plurality of user profiles may be analyzed to identify an exemplary user profile associated with the exemplary client device. For example, the plurality of user profiles may be analyzed based upon exemplary identification information (e.g., one or more of client device identification information, an IP address, a network identification address associated with a network that the exemplary client device is connected to, etc.) of the exemplary client device to identify the exemplary user profile. For example, the exemplary identification information may be determined based upon the exemplary request for content (e.g., the exemplary request for content may comprise the exemplary identification information). Alternatively and/or additionally, the exemplary user profile may comprise the exemplary identification information. For example, the exemplary user profile may be identified based upon a determination that the exemplary identification information of the exemplary request for content matches the exemplary user profile of the plurality of user profiles.

Alternatively and/or additionally, the exemplary client device may be associated with an exemplary user account (e.g., an email account, a content platform account, etc.) with the content system. For example, the exemplary client device may be logged into the exemplary user account. In some examples, the exemplary user profile may comprise an indication of the exemplary user account (e.g., the exemplary user profile may comprise a username associated with the exemplary user account). The plurality of user profiles may be analyzed based upon the exemplary user account (e.g., the username) to identify the exemplary user profile. For example, the exemplary user account and/or the username may be determined based upon the exemplary request for content (e.g., the exemplary request for content may comprise the username).

In some examples, the exemplary user profile may be indicative of an exemplary set of applications (accessed and/or interacted with via the exemplary client device and/or the exemplary user account) of the plurality of sets of applications. For example, the exemplary set of applications may be indicative of one or more applications. The one or more applications may comprise an application that is a first type of application of a plurality of types of applications. For example, the plurality of types of applications may correspond to one or more of arcade game applications, sports game applications, scheduling applications, navigation applications, email applications, productivity applications, news article applications, video platform applications, communication applications, etc. In an example, the first type of application may correspond to a game application. Accordingly, it may be determined, based upon the exemplary set of applications, that an exemplary user associated with the exemplary client device is interested in game applications.

In some examples, an exemplary content item (e.g., one or more of an advertisement, a news article, a video clip, etc.) may be selected for transmission to the exemplary client device. For example, the exemplary content item may be selected based upon the first type of application. In an example, the exemplary content item may comprise information associated with an exemplary application associated with the first type of application (e.g., the exemplary application may be a table tennis application). The exemplary content item may be transmitted to the exemplary client device. For example, the content system may provide the exemplary content item to be presented via a web page accessed by the exemplary client device.

In some systems, user-agent fields (e.g., user-agent request headers) transmitted by client devices and/or hosts may be analyzed to identify applications associated with the user-agent fields. For example, an exemplary user-agent field may be indicative of one or more of an application type, an operating system, a software vendor, a software version, etc. associated with an exemplary application corresponding to the exemplary user-agent field. The exemplary application may be determined based upon the exemplary user-agent field. However, network traffic associated with one or more protocols, such as HTTPS, may be associated with transmission and/or reception of data that does not comprise user-agent fields and/or the data may be encrypted such that user-agent fields may not be identified using the data. Accordingly, in accordance with one or more of the techniques presented herein, applications associated with network traffic associated with the one or more protocols may be identified based upon hosts associated with the network traffic (e.g., the applications may be identified based upon host names and/or domains comprised within data of the network traffic, such as host names and/or domains within server name indications (SNIs) associated with Transport Layer Security (TLS) handshakes).

At 402, activity of one or more first client devices may be monitored to detect one or more first sets of network traffic. A set of network traffic of the one or more first sets of network traffic (and/or each set of network traffic of the one or more first sets of network traffic) may be associated with a client device of the one or more first client devices. For example, a set of network traffic of the one or more first sets of network traffic (and/or each set of network traffic of the one or more first sets of network traffic) may comprise transmission of data by a client device of the one or more first client devices to one or more first hosts and/or reception of data by the client device from one or more second hosts. In some examples, the one or more first hosts may be the same as the one or more second hosts. Alternatively and/or additionally, the one or more first hosts may be different than the one or more second hosts.

In some examples, a host of the one or more first hosts and/or the one or more second hosts may correspond to a server and/or a device (e.g., a computer) that provides data (e.g., resources, information, etc.) to client devices in association with one or more applications. For example, when a client device accesses and/or interacts with an application, the client device may transmit one or more requests for resources (e.g., network calls, network requests, resource requests, etc.) to one or more hosts associated with the application. Alternatively and/or additionally, the one or more hosts may transmit data associated with the one or more requests for resources to the client device responsive to receiving the one or more requests for resources.

In an example, the application may be an email application and/or the one or more requests for resources may correspond to one or more requests for email information (e.g., the email information may correspond to one or more emails received by an email account associated with the email application). Responsive to receiving the one or more requests for resources, the one or more hosts may transmit, to the client device, data comprising the one or more emails.

In another example, the application may be a weather application and/or the one or more requests for resources may correspond to one or more requests for weather information (e.g., the weather information may correspond to one or more weather characteristics associated with a region). Responsive to receiving the one or more requests for resources, the one or more hosts may transmit, to the client device, data comprising the one or more weather characteristics associated with the region.

In some examples, the one or more first sets of network traffic may comprise a first exemplary set of network traffic associated with a first exemplary client device of the one or more first client devices. The first exemplary set of network traffic may comprise a first exemplary set of host events associated with one or more first exemplary hosts. For example, a first exemplary host event of the first exemplary set of host events may correspond to transmission of a first exemplary data packet (e.g., the first exemplary data packet may comprise one or more of a request for a resource, information, etc.) by the first exemplary client device to a first exemplary host of the one or more first exemplary hosts. Alternatively and/or additionally, a second exemplary host event of the first exemplary set of host events may correspond to reception of a second exemplary data packet by the first exemplary client device from a second exemplary host of the one or more first exemplary hosts.

In some examples, the first exemplary data packet associated with the first exemplary host event may be analyzed to determine the first exemplary host. For example, the first exemplary data packet may comprise an indication of the first exemplary host (e.g., the first exemplary data packet may comprise a host name and/or a domain associated with the first exemplary host). Alternatively and/or additionally, the indication of the first exemplary host may correspond to an SNI of the first exemplary data packet. Alternatively and/or additionally, the second exemplary data packet associated with the second exemplary host event may be analyzed to determine the second exemplary host. For example, the second exemplary data packet may comprise an indication of the second exemplary host (e.g., the second exemplary data packet may comprise a host name and/or a domain associated with the second exemplary host). Alternatively and/or additionally, the indication of the second exemplary host may correspond to an SNI of the second exemplary data packet.

In some examples, a first exemplary time (e.g., a timestamp) associated with the first exemplary data packet and/or the first exemplary host event may be determined based upon the first exemplary data packet (e.g., the first exemplary time may correspond to a time of transmission of the first exemplary data packet). Alternatively and/or additionally, a second exemplary time (e.g., a timestamp) associated with the second exemplary data packet and/or the second exemplary host event may be determined based upon the second exemplary data packet.

In some examples, an exemplary set of hosts (comprising the first exemplary host and the second exemplary host) associated with the first exemplary set of host events may be determined based upon the first exemplary set of host events (and/or based upon an exemplary set of data packets associated with the first exemplary set of host events). Alternatively and/or additionally, an exemplary set of times (e.g., timestamps) (comprising the first exemplary time and/or the second exemplary time) associated with the first exemplary set of host events may be determined based upon the first exemplary set of host events (and/or based upon an exemplary set of data packets associated with the first exemplary set of host events).

In some examples, the one or more first sets of network traffic may be detected using one or more proxies. For example, the first exemplary set of host events may be performed via the one or more proxies. For example, the first exemplary data packet may be transmitted by the first exemplary client device to an exemplary proxy of the one or more proxies. Responsive to receiving the first exemplary data packet, the first exemplary data packet may be transmitted by the exemplary proxy to the first exemplary host. Alternatively and/or additionally, the second exemplary data packet may be transmitted by the second exemplary host to the exemplary proxy. Responsive to receiving the second exemplary data packet, the second exemplary data packet may be transmitted by the exemplary proxy to the first exemplary client device. In some examples, the exemplary set of times associated with the first exemplary set of host events may be determined using the one or more proxies.

Figure 5A:
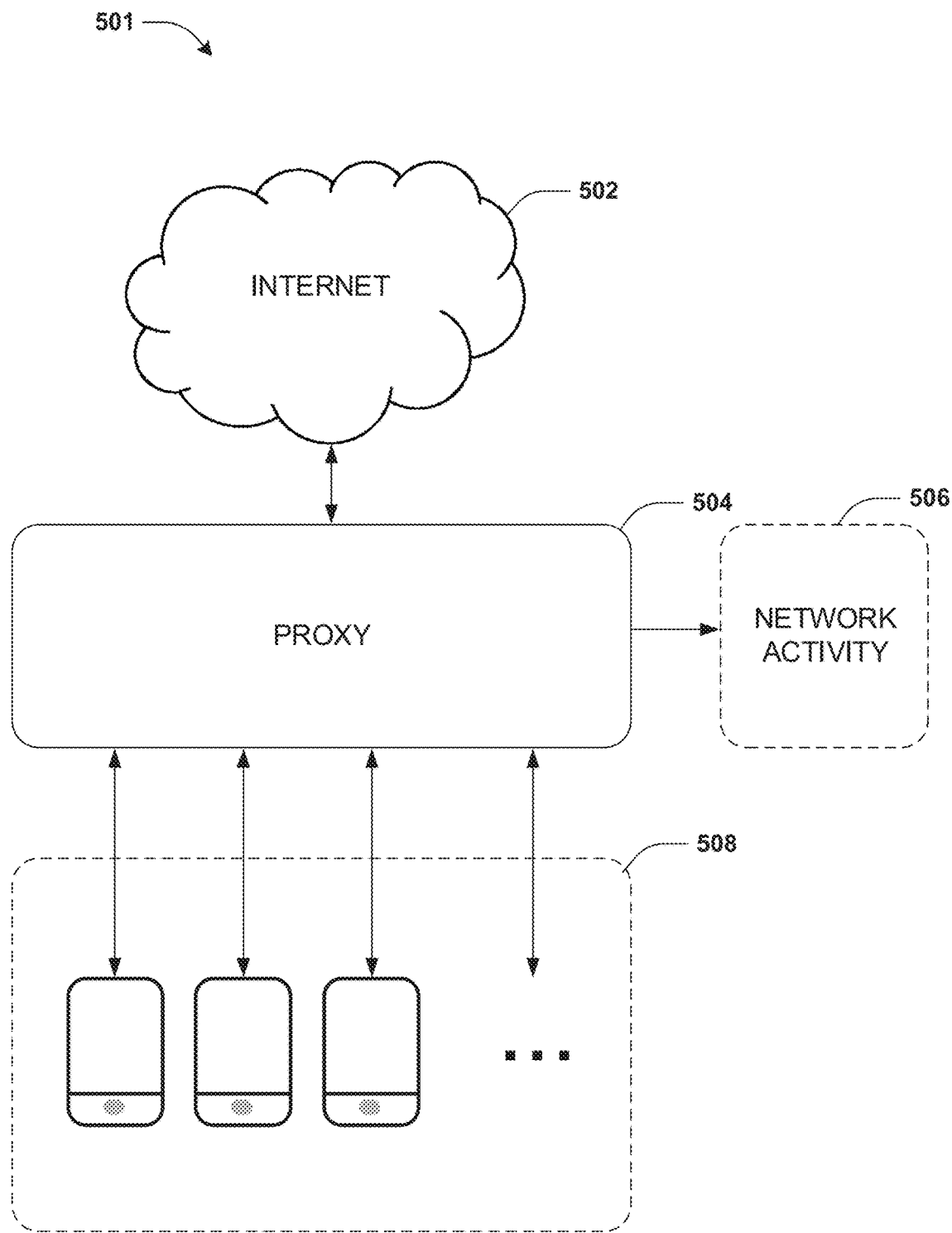
FIG. 5A is a component block diagram illustrating an example system for determining an application associated with network traffic of a client device, where network traffic associated with one or more client devices is detected using a proxy.

FIGS. 5A-5F illustrate an exemplary system 501 for determining an application associated with network traffic of a client device. FIG. 5A illustrates an exemplary scenario where network traffic associated with one or more client devices 508 (e.g., the one or more first client devices) is detected using a proxy 504 (e.g., the one or more proxies). For example, network traffic between the one or more client devices 508 and one or more hosts (e.g., via the internet 502) may pass through the proxy 504. Network activity information 506 associated with the network traffic may be determined using the proxy 504. For example, the network activity information 506 may comprise one or more of one or more hosts associated with one or more host events of the network traffic, one or more times associated with the one or more host events, etc.

Alternatively and/or additionally, rather than using the one or more proxies to determine the exemplary set of hosts and/or the exemplary set of times associated with the exemplary set of host events, the exemplary set of hosts and/or the exemplary set of times may be determined by analyzing the exemplary set of data packets associated with the first exemplary set of host events using the ISP associated with the application identification system and/or the packet analyzer (and/or by using one or more different techniques associated with intercepting the first exemplary set of network traffic and/or analyzing the exemplary set of data packets). Alternatively and/or additionally, the first exemplary client device may transmit network traffic information indicative of the exemplary set of host events, the exemplary set of times and/or the exemplary set of hosts to the application identification system (and/or to a server associated with the application identification system).

In some examples, application information associated with one or more second client devices of the one or more first client devices, may be available to the application identification system. For example, the one or more second client devices may be the same as the one or more first client devices. Alternatively and/or additionally, the one or more second client devices may be a subset (e.g., merely a portion) of the one or more first client devices. Alternatively and/or additionally, the application information and/or the one or more second client devices may be associated with one or more second sets of network traffic of the one or more first sets of network traffic. For example, the one or more second sets of network traffic may be the same as the one or more first sets of network traffic. Alternatively and/or additionally, the one or more second sets of network traffic may be a subset (e.g., merely a portion) of the one or more first sets of network traffic.

In some examples, the one or more second sets of network traffic may comprise a second exemplary set of network traffic associated with a second exemplary client device of the one or more second client devices. First application information associated with the second exemplary set of network traffic and/or the second exemplary client device may be determined. For example, the first application information may correspond to a first exemplary period of time that a first exemplary application is being accessed and/or interacted with using the second exemplary client device. For example, the first exemplary period of time that the first exemplary application is being accessed and/or interacted with may correspond to a first exemplary application session. The first exemplary application session may correspond to usage of the first exemplary application between a time that the first exemplary application is opened by the first exemplary client device and a time that the first exemplary application is closed by the first exemplary client device.

Alternatively and/or additionally, the first application information may correspond to one or more actions associated with the first exemplary application and/or one or more interactions with the first exemplary application (e.g., the one or more actions and/or the one or more interactions may correspond to one or more of clicks, selections of selectable inputs of the first exemplary application, accessing resources of the first exemplary application, etc.) performed via the second exemplary client device. In some examples, the one or more actions associated with the first exemplary application may be performed automatically by the second exemplary client device. For example, opening of the first exemplary application, the one or more actions associated with the first exemplary application and/or closing of the first exemplary application may be performed responsive to execution of one or more instructions and/or one or more programs. The execution of the one or more instructions and/or the one or more programs may be configured to simulate human interaction with the first exemplary application. Alternatively and/or additionally, opening of the first exemplary application, the one or more actions associated with the first exemplary application and/or closing of the first exemplary application may be performed via user (e.g., human) interaction with the second exemplary client device.

Alternatively and/or additionally, the first exemplary application (and/or one or more other applications) may be downloaded from a server and/or installed (automatically) on the second exemplary client device responsive to execution of one or more instructions and/or one or more programs associated with automatic installation of applications.

Alternatively and/or additionally, a second exemplary set of host events associated with the first exemplary period of time that the first exemplary application is being accessed and/or interacted with may be detected. For example, the second exemplary set of host events may occur within the first exemplary period of time. Data packets associated with the second exemplary set of host events may be analyzed to determine a second exemplary set of hosts (associated with the second exemplary set of host events) and/or a second exemplary set of times (associated with the second exemplary set of hosts events). It may be determined that the second exemplary set of host events, the second exemplary set of hosts and/or the second exemplary set of times are associated with the first exemplary application and/or the first exemplary application session based upon the second exemplary set of times being within the first exemplary period of time. For example, it may be determined that the second exemplary set of host events occur as a result of the first exemplary application being accessed and/or interacted with via the second exemplary client device.

For example, a first notification may be received (by the application identification system) from the second exemplary client device of the one or more second client devices. The first notification may be transmitted by the second exemplary client device responsive to the first exemplary application being opened. The first notification may be indicative of the first exemplary application session being started and/or the first exemplary application being opened at a first exemplary time. Alternatively and/or additionally, a second notification may be transmitted by the second exemplary client device (and/or received by the application identification system) responsive to an action associated with the first exemplary application and/or an interaction with the first exemplary application (e.g., the third notification may be indicative of one or more of a click, a selection, a selectable input that is clicked and/or selected, a resource that is accessed, etc.). A third notification may be received (by the application identification system) from the second exemplary client device. The third notification may be transmitted by the second exemplary client device responsive to the first exemplary application being closed. The third notification may be indicative of the first exemplary application session being finished and/or the first exemplary application being closed at a second exemplary time. Alternatively and/or additionally, the first exemplary period of time may correspond to a time between the first exemplary time and the second exemplary time. Alternatively and/or additionally, the second exemplary set of host events may occur between the first exemplary time and the second exemplary time.

In some examples, one or more instructions may be transmitted to the second exemplary client device and/or one or more programs may be installed (automatically) on the second exemplary client device. For example, execution of the one or more instructions and/or the one or more programs may cause the second exemplary client device to transmit the first application information (to the application identification system). For example, execution of the one or more instructions and/or the one or more programs may cause the second exemplary client device to transmit a notification (to the application identification system) indicative of a time that an application (e.g., the first exemplary application and/or a different application) is opened, a time that an application is closed, a time that an application session is started, a time that an application session is finished, a time associated with an action associated with an application, a time associated with an interaction with an application (e.g., a selection of a selectable input, a click, etc.). In some examples, the one or more instructions may be transmitted to the second exemplary client device and/or the one or more programs may be installed on the second exemplary client device (and/or the one or more instructions and/or the one or more programs may be executed) responsive to receiving an indication of consent of a user associated with the second exemplary client device for transmission of the application information.

In some examples, one or more first sets of host information may be generated based upon the one or more first sets of network traffic. In some examples, a set of host information of the one or more first sets of host information (and/or each set of host information of the one or more first sets of host information) may be associated with a client device of the one or more first client devices. Alternatively and/or additionally, a set of host information of the one or more first sets of host information (and/or each set of host information of the one or more first sets of host information) may be indicative of one or more of a set of host events associated with a set of network traffic of the one or more first sets of network traffic, a set of times (e.g., timestamps) associated with the set of host events, one or more hosts associated with the set of host events, a set of application information (of an application) associated with the set of host events (if the set of application information associated with the set of host events is available), etc.

At 404, the one or more first sets of network traffic (and/or the one or more first sets of host information) may be analyzed to generate a first set of network traffic information associated with a first application. The first set of network traffic information may be indicative of a first set of hosts associated with the first application. Alternatively and/or additionally, the one or more first sets of network traffic may be analyzed to generate a plurality of sets of network traffic information associated with a plurality of applications. The plurality of sets of network traffic information may comprise the first set of network traffic information.

In some examples, one or more first applications of the plurality of applications may correspond to one or more mobile applications. Alternatively and/or additionally, one or more second applications of the plurality of applications may correspond to one or more software development kits (SDKs). Alternatively and/or additionally, one or more third applications of the plurality of applications may correspond to one or more versions of a single application. For example, a second exemplary application of the one or more third applications may correspond to a first version of the single application and/or a third exemplary application of the one or more third applications may correspond to a second version of the single application. For example, the first version of the single application may be configured for a first operating system and/or the second version of the single application may be configured for a second operating system. Alternatively and/or additionally, the first version of the single application may be associated with a first release date and/or the second version of the single application may be associated with a second release date. For example, a client device having the first version of the single application installed may receive a software update which may install the second version of the single application in place of the first version of the single application.

In some examples, a set of network traffic information of the plurality of sets of network traffic information (and/or each set of network traffic information of the plurality of sets of network traffic information) may be associated with an application of the plurality of applications. For example, a set of network traffic information of the plurality of sets of network traffic information (and/or each set of network traffic information of the plurality of sets of network traffic information) may be indicative of a set of hosts associated with an application of the plurality of applications. For example, the plurality of sets of network traffic information may be indicative of a plurality of sets of hosts comprising the first set of hosts associated with the first application.

In some examples, the plurality of sets of network traffic information may be generated based upon the application information. For example, the application information may comprise a plurality of sets of application information generated based upon a plurality of application sessions. In some examples, a set of application information of the plurality of sets of application information (and/or each set of application information of the plurality of sets of application information) may be associated with an application session of the plurality of application sessions. An application session of the plurality of applications sessions (and/or each application session of the plurality of applications sessions) may be associated with an application of the plurality of applications. For example, an application session of the plurality of applications sessions may correspond to an application of the plurality of applications being accessed and/or interacted with using a client device during a period of time between the application being opened and the application being closed.

In some examples, one or more sets of application information of the plurality of sets of application information may be associated with one or more first application sessions associated with the first application. Alternatively and/or additionally, a set of application information of the one or more sets of application information (and/or each set of application information of the one or more sets of application information) may be associated with a set of host events.

In some examples, one or more first sets of host events may be associated with host events that occur during and/or in association with the one or more first application sessions. For example, a first set of host events, of the one or more first sets of host events, may be associated with host events that occur during and/or in association with a first application session of the one or more first application sessions. A host event of the first set of host events may correspond to transmission of a data packet, by a client device associated with the first application session, to a host of the first set of hosts associated with the first application during and/or in association with the first application session. Alternatively and/or additionally, a host event of the first set of host events may correspond to reception of a data packet, by the client device associated with the first application session, from a host of the first set of hosts associated with the first application during and/or in association with the first application session.

In some examples, the first set of host events (associated with the first application session) may be analyzed to determine a second set of hosts associated with the first set of host events. For example, the second set of hosts may be selected for inclusion in the first set of hosts associated with the first application. For example, a host of the second set of hosts may be selected for inclusion in the first set of hosts associated with the first application based upon one or more host events of the first set of host events being associated the host. Alternatively and/or additionally, one or more sets of host events (different than the first set of host events) of the one or more first sets of host events associated with one or more application sessions (different than the first application session) of the one or more first application sessions may be analyzed to select one or more other hosts for inclusion in the first set of hosts associated with the first application.

In some examples, the one or more first sets of network traffic may be associated with a first plurality of hosts. For example, the one or more first sets of network traffic may comprise one or more host events associated with a host (and/or each host) of the first plurality of hosts. Alternatively and/or additionally, the one or more first sets of host information may be indicative of the first plurality of hosts. For example, a set of host information of the one or more first sets of host information may be indicative of one or more hosts of the first plurality of hosts.

In some examples, the first plurality of hosts may be clustered (and/or grouped) into the plurality of sets of hosts associated with the plurality of applications. For example, the first plurality of hosts may be clustered into the plurality of sets of hosts based upon temporal sequences of host events of the one or more first sets of network traffic. For example, an application of the plurality of applications (and/or each application of the plurality of applications) may be associated with one or more temporal sequences of host events.

In some examples, the first application of the plurality of applications may be associated with one or more first temporal sequences (e.g., patterns) of host events. For example, the one or more first temporal sequences of host events may be determined based upon the one or more first sets of host events associated with the one or more first application sessions associated with the first application. Alternatively and/or additionally, the one or more first temporal sequences of host events may be determined based upon times associated with the one or more first sets of host events. For example, the one or more first temporal sequences of host events may be determined by analyzing the one or more first sets of host events using one or more pattern recognition techniques (and/or one or more other techniques).

In some examples, host events associated with the one or more first sets of network traffic and/or the one or more first sets of host information may be analyzed to identify one or more first sequences of host events that match the one or more first temporal sequences. A sequence of host events corresponds to multiple host events that occur consecutively. For example, an exemplary sequence of host events of the one or more first sequences of host events may correspond to (at least a portion of) a set of host events of a set of network traffic of the one or more sets of network. The exemplary sequence of host events may have one or more temporal sequence characteristics that may match an exemplary temporal sequence of the one or more first temporal sequences (e.g., the one or more temporal sequence characteristics may be similar to the one or more first temporal sequences). In some examples, the one or more temporal sequence characteristics may match the exemplary temporal sequence of the one or more first temporal sequences if one or more of a pattern associated with the exemplary sequence of host events is similar to the exemplary temporal sequence, if time-lengths between host events associated with the exemplary sequence (e.g., spacings between the host events) are similar to the exemplary temporal sequence, etc. Alternatively and/or additionally, one or more data packets and/or one or more sets of host information of the one or more first sets of host information associated with the one or more first sequences of host events that match the one or more first temporal sequences may be analyzed to identify one or more hosts associated with the one nor more first sequences of host events. The one or more hosts may be selected for inclusion in the first set of hosts (associated with the first application).

Alternatively and/or additionally, the first plurality of hosts may be clustered into the plurality of sets of hosts based upon host names associated with the first plurality of hosts. For example, an application of the plurality of applications (and/or each application of the plurality of applications) may be associated with one or more host names.

In some examples, the first application of the plurality of applications may be associated with one or more first host names. For example, the one or more first host names may be determined based upon the one or more first sets of host events associated with the one or more first application sessions associated with the first application. Alternatively and/or additionally, the one or more first host names may be associated with one or more exemplary hosts associated with the one or more first sets of host events. For example, a host name of the one or more host first names (and/or each host name of the one or more host first names) may be associated with and/or may be assigned to a host of the one or more exemplary hosts associated with the one or more first sets of host events.

In some examples, host events associated with the one or more first sets of network traffic and/or the one or more first sets of host information may be analyzed to identify one or more exemplary hosts having host names that match one or more host names of the one or more first host names associated with the first application. For example, it may be determined that a first exemplary host name associated with a host of the one or more exemplary hosts matches a second exemplary host name of the one or more first host names associated with the first application responsive to one or more of a determination that one or more of the first exemplary host name and/or the second exemplary host name comprise one or more matching words, a determination that the first exemplary host name and/or the second exemplary host name comprise one or more matching letters, a determination that the first exemplary host name and/or the second exemplary host name comprise one or more matching labels, a determination that a quantity of words of the one or more matching words is greater than a threshold quantity of matching words, a determination that a quantity of letters of the one or more matching letters is greater than a threshold quantity of matching letters, a determination that a quantity of labels of the one or more matching labels is greater than a threshold quantity of matching labels, a determination that a proportion of the one or more matching words to words of the first exemplary host name is greater than a first threshold proportion, a determination that a threshold proportion of the one or more matching words to words of the second exemplary host name is greater than a second threshold proportion, a determination that that a proportion of the one or more matching letters to letters of the first exemplary host name is greater than a third threshold proportion, a determination that a proportion of the one or more matching letters to letters of the second exemplary host name is greater than a fourth threshold proportion, a determination that that a proportion of the one or more matching labels to labels of the first exemplary host name is greater than a fifth threshold proportion, a determination that a proportion of the one or more matching labels to labels of the second exemplary host name is greater than a sixth threshold proportion, etc. In an example, it may be determined that "en.example.search.app" matches "fr.example.search.app". In some examples, the one or more exemplary hosts may be selected for inclusion in the first set of hosts (associated with the first application).

In some examples, the first plurality of hosts may be clustered into the plurality of sets of hosts by generating a first plurality of vector representations based upon the one or more first sets of network traffic and/or the one or more first sets of host information. For example, the one or more first sets of network traffic and/or the one or more first sets of host information may be analyzed to identify a plurality of sequences of host events. For example, each sequence of host events of the plurality of sequences of host events may be associated with an application session. Alternatively and/or additionally, each sequence of host events of the plurality of sequences of host events may correspond to network traffic that occurs using a client device within a period of time (e.g., the period of time may be defined).

In some examples, the first plurality of vector representations may be generated based upon the plurality of sequences of host events. For example, a vector representation of the first plurality of vector representations (and/or each vector representation of the first plurality of vector representations) may be generated based upon a sequence of host events of the plurality of sequences of host events. In some examples, the first plurality of vector representations may correspond to numerical representations of the plurality of sequences of host events (e.g., a vector representation of the first plurality of vector representations may be a numerical representation and/or a numerical embedding of a sequence of host events of the first plurality of host events).

Alternatively and/or additionally, prior to generating the plurality of vector representations, the plurality of sequences of host events may be analyzed to identify instances where multiple consecutive host events are associated with a single host. Sequences of host events of the plurality of sequences of host events may be modified to generate a modified plurality of sequences of host events based upon the instances where multiple consecutive host events are associated with a single host. For example, responsive to identifying an instance of a sequence of host events where multiple consecutive host events are associated with a single host, one or more host events may be removed to generate a modified sequence of host events. Rather than the modified sequence of host events comprising the multiple consecutive host events, the modified sequence of host events may comprise merely a single host event in place of the multiple consecutive host events. For example, the first plurality of vector representations may be generated based upon the modified plurality of sequences of host events.

In an example, a first exemplary vector representation of the first plurality of vector representations may be generated based upon an exemplary sequence of host events of the plurality of sequences of host events. In some examples, the first exemplary vector representation may be indicative of one or more exemplary hosts associated with the exemplary sequence of host events. Alternatively and/or additionally, the first exemplary vector representation may be indicative of a temporal sequence of host events associated with the exemplary sequence of host events. Alternatively and/or additionally, the first exemplary vector representation may be indicative of one or more host names associated with the one or more exemplary hosts. Alternatively and/or additionally, the first exemplary vector representation may comprise one or more vectors indicative of the one or more exemplary hosts. For example, a vector of the one or more vectors (and/or each vector of the one or more vectors) may be indicative of a host of the one or more exemplary hosts, a host name associated with the host and/or a temporal sequence associated with the host and/or the exemplary sequence of host events.

In some examples, the first plurality of vector representations may be generated using one or more word2vec techniques. For example, a vector representation of the first plurality of vector representations (and/or each vector representation of the first plurality of vector representations) may be generated using the one or more word2vect techniques. Alternatively and/or additionally, a vector representation of the first plurality of vector representations (and/or each vector representation of the first plurality of vector representations) may correspond to a word2vec embedding (e.g., a numerical representation) associated with a sequence of host events of the plurality of sequences of host events. It may be appreciated that word2vec is an exemplary algorithm configured to receive as input a corpus of text and generate vectors and/or numerical representations. While word2vec may be mentioned herein, one or more other algorithms similarly configured to receive as input a corpus of text and generate vectors and/or numerical representations may be used instead (and/or in addition), and are contemplated.

In some examples, the first plurality of hosts may be clustered into the plurality of sets of hosts based upon the first plurality of vector representations. For example, one or more first techniques may be applied to the first plurality of vector representations to cluster the first plurality hosts into the plurality of sets of hosts based upon one or more of temporal sequences of host events, host names associated with hosts, values and/or vectors associated with the first plurality of vector representations, etc. Alternatively and/or additionally, the one or more first techniques may be applied to the first plurality of vector representations to generate the plurality of sets of network traffic information (associated with the plurality of applications). In some examples, the one or more first techniques may comprise one or more clustering techniques (e.g., one or more machine learning techniques, one or more word2vec clustering techniques, one or more lexical clustering techniques and/or one or more temporal clustering techniques).

In some examples, a set of network traffic information of the plurality of sets of network traffic information (and/or each set of network traffic information of the plurality of sets of network traffic information) may be indicative of a set of hosts (e.g., a set of one or more hosts), of the plurality of sets of hosts, associated with an application of the plurality of applications. Alternatively and/or additionally, a set of network traffic information of the plurality of sets of network traffic information (and/or each set of network traffic information of the plurality of sets of network traffic information) may be indicative of a set of host names associated with a set of hosts associated with an application of the plurality of applications. Alternatively and/or additionally, a set of network traffic information of the plurality of sets of network traffic information (and/or each set of network traffic information of the plurality of sets of network traffic information) may be indicative of one or more temporal sequences associated with an application of the plurality of applications and/or host events associated with the application.

Alternatively and/or additionally, a set of network traffic information of the plurality of sets of network traffic information (and/or each set of network traffic information of the plurality of sets of network traffic information) may be indicative of a set of quantities of host events associated with a set of hosts associated with an application of the plurality of applications. For example, the first set of network traffic information of the plurality of sets of network traffic information may be indicative of a first set of quantities of host events associated with the first set of hosts associated with the first application. In some examples, a quantity of host events of the first set of quantities of host events (and/or each quantity of host events of the first set of quantities of host events) may correspond to host events, that occur in association with the first application, associated with a host of the first set of hosts. For example, a first quantity of host events of the first set of quantities of host events may correspond to host events, that occur in association with the first application, associated with a first host of the first set of hosts. In some examples, the first quantity of host events may be determined by analyzing the one or more first sets of network traffic and/or the one or more first sets of host information.

In some examples, it may be determined that each host of one or more third hosts of the plurality of sets of hosts are associated with multiple applications. In an example, it may be determined that a second host of the first set of hosts is associated with the first application and/or a second application. For example, it may be determined that the second host of the first set of hosts is associated with the first application and the second application based upon an identification of the second host within the first set of network traffic information and within a second set of network traffic information associated with the (e.g., the second host may be a part of the first set of hosts associated with the first application and a third set of hosts associated with the second application).

Alternatively and/or additionally, it may be determined that the second host is associated with multiple applications based upon a first quantity of client devices of a first plurality of client devices and/or a second quantity of client devices of a second plurality of client devices. For example, the first plurality of client devices (and/or each client device of the first plurality of client devices) may be associated with data reception from the second host and/or data transmission to the second host during a first period of time. Alternatively and/or additionally, the second plurality of client devices (and/or each client device of the second plurality of client devices) may be associated with accessing and/or interacting with the first application during the first period of time. In some examples, the first quantity of client devices of the first plurality of client devices may be compared with the second quantity of client devices of the second plurality of client devices to determine whether the second host is associated with multiple applications or whether the second host is associated with merely the first application. For example, it may be determined that the second host is associated with multiple applications responsive to a determination that the first quantity of client devices of the first plurality of client devices is greater than the second quantity of client devices of the second plurality of client devices and/or responsive to a determination that a difference between the first quantity of client devices of the first plurality of client devices and the second quantity of client devices of the second plurality of client devices is greater than a threshold difference.

In some examples, the first quantity of client devices of the first plurality of client devices may be determined by analyzing the one or more first sets of network traffic and/or the one or more first sets of host information based upon the second host. Alternatively and/or additionally, the second quantity of client devices of the first plurality of client devices may be determined by analyzing the one or more first sets of network traffic and/or the one or more first sets of host information based upon the first application. Alternatively and/or additionally, the second quantity of client devices of the second plurality of client devices may be determined based upon analytical information received from one or more analytical engines configured to track application usage of the first application (and/or other applications of the plurality of applications).

Alternatively and/or additionally, it may be determined that the first set of hosts (associated with the first application) is associated with multiple applications based upon a third quantity of client devices of a third plurality of client devices and/or the second quantity of client devices of the second plurality of client devices. For example, the third plurality of client devices (and/or each client device of the third plurality of client devices) may be associated with data reception from a host of the first set of hosts and/or data transmission to a host of the first set of hosts during the first period of time. In some examples, the third quantity of client devices of the third plurality of client devices may be compared with the second quantity of client devices of the second plurality of client devices to determine whether the first set of hosts is associated with multiple applications or whether the first set of hosts is associated with merely the first application. For example, it may be determined that the first set of hosts is associated with multiple applications responsive to a determination that the third quantity of client devices of the third plurality of client devices is greater than the second quantity of client devices of the second plurality of client devices and/or responsive to a determination that a difference between the third quantity of client devices of the third plurality of client devices and the second quantity of client devices of the second plurality of client devices is greater than the threshold difference.

In some examples, the one or more third hosts (that are associated with multiple applications) may be removed from the plurality of sets of hosts. Alternatively and/or additionally, the one or more third hosts may be removed from the plurality of sets of network traffic information. Alternatively and/or additionally, the one or more third hosts may be blacklisted (such that the one or more third hosts are not used for collecting application usage information). Alternatively and/or additionally, the one or more third hosts may not be blacklisted and/or may not be removed from the plurality of sets of hosts and/or from the plurality of sets of network traffic information.

In some examples, a first network traffic information data structure (e.g., one or more of one or more lists, one or more arrays, one or more matrixes, etc.) associated with the plurality of sets of network traffic information may be generated. In some examples, the first network traffic information data structure may be generated based upon the one or more first sets of network traffic and/or the one or more first sets of host information. Alternatively and/or additionally, the first network traffic information data structure may comprise a plurality of rows (and/or columns) corresponding to the plurality of applications and/or a plurality of columns (and/or rows) corresponding to the first plurality of hosts. Alternatively and/or additionally, the first network traffic information data structure may comprise a plurality of values associated with an application of the plurality of applications (and/or associated with each application of the plurality of applications).

For example, the first network traffic information data structure may comprise a first plurality of values associated with the first application. For example, a value of the first plurality of values (and/or each value of the first plurality of values) may be indicative of a quantity of host events associated with a host of the first plurality of hosts, with respect to the first application. For example, a first set of values of the first plurality of values may be associated with the first set of hosts associated with the first application. The first set of values may be associated with the first set of quantities of host events associated with the first set of hosts. For example, a value of the first set of values (and/or each value of the first set of values) may be indicative of a quantity of host events of the first set of quantities of host events associated with a host of the first set of hosts. For example, a first value of the first set of values may be indicative of the first quantity of host events of the first set of quantities of host events associated with the first host of the first set of hosts associated with the first application.

Alternatively and/or additionally, the first set of values may not be indicative of the first set of quantities of host events. For example, the first set of values may be merely indicative of the first set of hosts being associated with the first application (e.g., the first set of values may be set to 1 and/or a different value indicative of the first set of hosts being associated with the first application).

Alternatively and/or additionally, a second set of values of the first plurality of values may be associated with one or more fourth hosts of the first plurality of hosts that are different than the first set of hosts. For example, the one or more fourth hosts may not be associated with the first application. Alternatively and/or additionally, the second set of values may be indicative of the one or more fourth hosts not being associated with the first application (e.g., the second set of values may be set to 0 and/or a different value indicative of the one or more fourth hosts not being associated with the first application).

Alternatively and/or additionally, a second network traffic information data structure (e.g., one or more of one or more lists, one or more arrays, one or more matrixes, etc.) associated with the plurality of sets of network traffic information may be generated. In some examples, the second network traffic information data structure may be generated based upon the one or more first sets of network traffic and/or the one or more first sets of host information. Alternatively and/or additionally, the second network traffic information data structure may comprise a second plurality of rows (and/or columns) corresponding to a plurality of application sessions and/or a second plurality of columns (and/or rows) corresponding to the first plurality of hosts. One or more application sessions of the plurality of application sessions may be associated with an application of the plurality of applications. Alternatively and/or additionally, the second network traffic information data structure may comprise a plurality of values associated with an application session of the plurality of application sessions (and/or associated with each application session of the plurality of application sessions).

For example, the second network traffic information data structure may comprise a second plurality of values associated with the first application session (associated with the first application). For example, a value of the second plurality of values (and/or each value of the second plurality of values) may be indicative of a quantity of host events associated with a host of the first plurality of hosts, with respect to the first application session. For example, the second plurality of values may be determined based upon the first set of host events associated with the first application session. For example, a third set of values of the second plurality of values may be associated with the second set of hosts associated with the first application. The third set of values may be associated with quantities of host events, within the first application session, associated with the second set of hosts. For example, a value of the third set of values (and/or each value of the third set of values) may be indicative of a quantity of host events of host events, within the first application session, associated with a host of the second set of hosts. Alternatively and/or additionally, the third set of values may be merely indicative of the second set of hosts being associated with the first application session (e.g., the third set of values may be set to 1 and/or a different value indicative of the second set of hosts being associated with the first application session).

Alternatively and/or additionally, a fourth set of values of the second plurality of values may be associated with one or more fifth hosts of the first plurality of hosts that are different than the second set of hosts. For example, the one or more fifth hosts may not be associated with the first application session. Alternatively and/or additionally, the fourth set of values may be indicative of the one or more fifth hosts not being associated with the first application session (e.g., the fourth set of values may be set to 0 and/or a different value indicative of the one or more fifth hosts not being associated with the first application session).

In some examples, one or more second techniques may be applied to the first network traffic information data structure, the second network traffic information data structure, the one or more first sets of host information and/or the plurality of vector representations to generate the plurality of sets of network traffic information. For example, the one or more second techniques may be associated with one or more of one or more machine learning models, one or more random forest models, one or more neural network models, one or more logistic regression models, one or more non-negative logistic regression models, one or more Hidden Markov models (HMMs), one or more sequence models, etc.

In some examples, a plurality of sets of coefficients associated with the plurality of applications may be generated. The plurality of sets of coefficients may be generated based upon the first network traffic information data structure, the second network traffic information data structure, the one or more first sets of host information and/or the plurality of vector representations. Alternatively and/or additionally, the plurality of sets of coefficients may be generated using the one or more second techniques. In some examples, the plurality of sets of network traffic information may comprise the plurality of sets of coefficients. For example, a set of network traffic information of the plurality of sets of network traffic information (and/or each set of network traffic information of the plurality of sets of network traffic information) may comprise a set of coefficients of the plurality of sets of coefficients.

In some examples, a set of coefficients of the plurality of sets of coefficients (and/or each set of coefficients of the plurality of sets of coefficients) may be associated with an application of the plurality of applications. Alternatively and/or additionally, a coefficient of a set of coefficients of the plurality of sets of coefficients (and/or each coefficient of the set of coefficients) may be associated with a host of the first plurality of hosts. Alternatively and/or additionally, a coefficient associated with a host of a set of coefficients associated with an application may be indicative of a probability that a client device that transmits data to and/or receives data from the host is accessing and/or interacting with the application.

For example, a first set of coefficients of the plurality of sets of coefficients may be associated with the first application. In some examples, a first coefficient of the first set of coefficients may be associated with the first host of the first set of hosts associated with the first application. The first coefficient may be indicative of a probability that a client device that transmits data to and/or receives data from the first host is accessing and/or interacting with the first application.

Figure 5B:
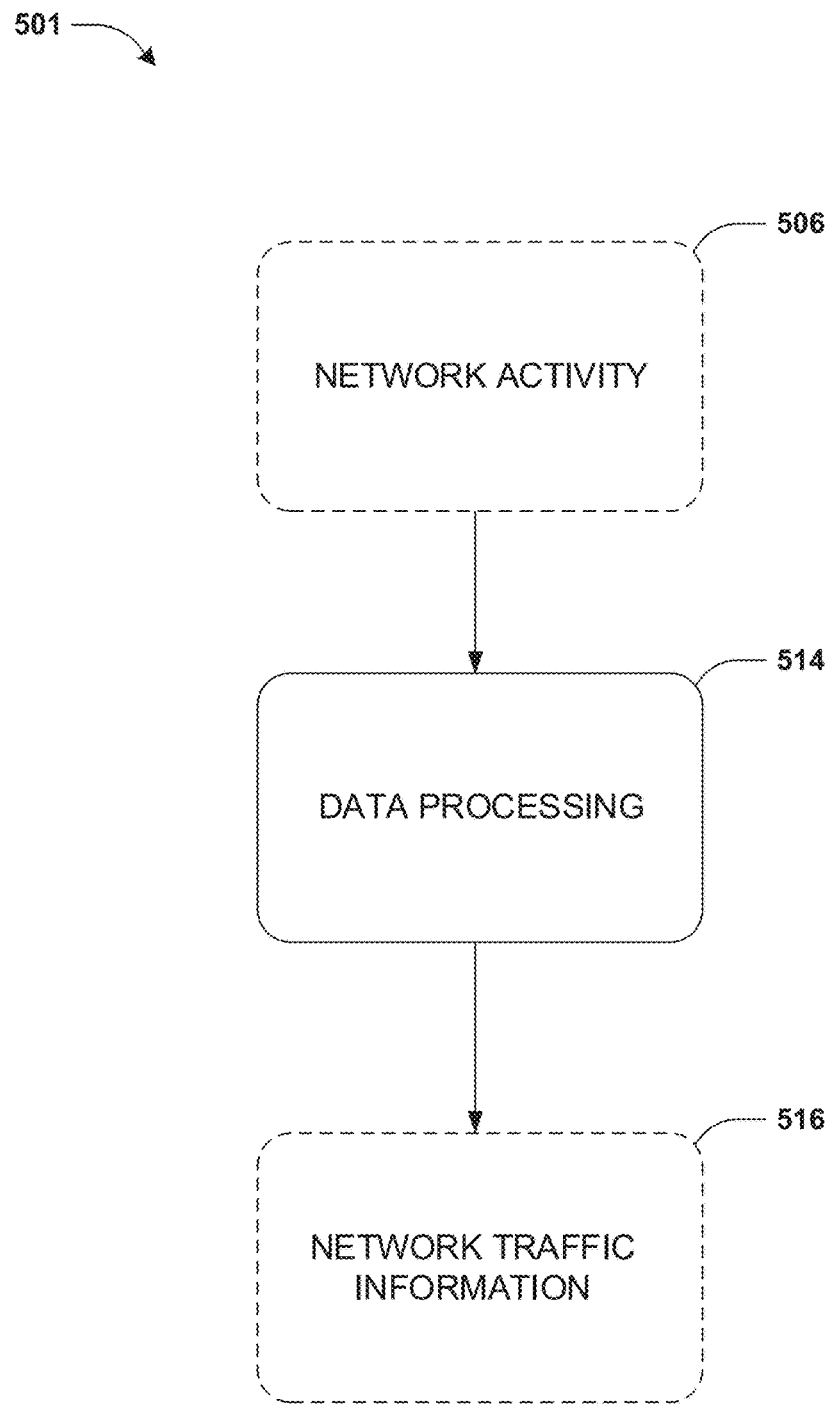
FIG. 5B is a component block diagram illustrating an example system for determining an application associated with network traffic of a client device, where network activity information is processed via data processing to generate network traffic information.

FIG. 5B illustrates an exemplary scenario where the network activity information 506 (e.g., the one or more first sets of host information) may be processed via data processing 514 to generate network traffic information 516. In some examples, the network traffic information 516 may correspond to the plurality of sets of network traffic information associated with the plurality of applications, the first plurality of vector representations, the first network traffic information data structure and/or the second network traffic information data structure.

At 406, second network traffic associated with a second client device may be detected. The second network traffic may comprise transmission of data by the second client device and/or reception of data by the second client device. In some examples, the second network traffic may correspond to a period of time (e.g., the second network traffic may comprise transmission of data by the second client device and/or reception of data by the second client device performed within the period of time).

In some examples, the second network traffic may correspond to a first sequence of host events associated with one or more sixth hosts. For example, a host event of the first sequence of host events (and/or each host event of the first sequence of host events) may correspond to a transmission of a data packet to a host of the one or more sixth hosts and/or reception of a data packet from a host of the one or more sixth hosts.

At 408, it may be determined that the second network traffic is associated with the first application based upon the second network traffic and/or the first set of network traffic information. Alternatively and/or additionally, it may be determined that the second network traffic is associated with the first application based upon the first sequence of host events and/or the one or more sixth hosts associated with the second network traffic. In some examples, a determination that the second network traffic is associated with the first application may correspond to a determination that data transmission and/or data reception associated with the second network traffic occurs as a result of the first application being accessed and/or interacted with via the second client device.

In some examples, the plurality of sets of hosts associated with the plurality of applications may be analyzed based upon the one or more sixth hosts. It may be determined that the second network traffic is associated with an application of the plurality of applications responsive to determining that one or more hosts of the one or more sixth hosts associated with the second network traffic are comprised within a set of hosts associated with the application. In some examples, one or more seventh hosts of the one or more sixth hosts may be comprised within the first set of hosts associated with the first application. For example, it may be determined that the second network traffic is associated with the first application responsive to determining that the one or more seventh hosts of the one or more sixth hosts are comprised within the first set of hosts associated with the first application. Alternatively and/or additionally, it may be determined that the second network traffic is associated with the first application responsive to determining that a quantity of hosts of the one or more seventh hosts meets a threshold quantity of hosts.

Alternatively and/or additionally, host names associated with the plurality of sets of hosts may be analyzed based upon the one or more sixth hosts. It may be determined that the second network traffic is associated with an application of the plurality of applications responsive to determining that one or more host names of the one or more sixth hosts associated with the second network traffic match (e.g., is similar to) one or more host names of a set of hosts associated with the application. In some examples, one or more second host names of (one or more hosts of) the one or more sixth hosts may match one or more third host names of (one or more hosts of) the first set of hosts associated with the first application. For example, it may be determined that the second network traffic is associated with the first application responsive to determining that the one or more second host names match the one or more third host names associated with the first application. In an example, the one or more second host names may comprise a third exemplary host name "couch.us.find.pscp" and/or the one or more third host names may comprise a fourth exemplary host name "couch.eu.find.pscp". It may be determined that the third exemplary host name matches the fourth exemplary host name.

Alternatively and/or additionally, temporal sequences associated with the plurality of applications may be analyzed based upon the first sequence of host events associated with the second network traffic. It may be determined that the second network traffic is associated with an application of the plurality of applications responsive to determining that one or more temporal sequence characteristics of the first sequence of host events matches one or more temporal sequences associated with the application. In some examples, the one or more temporal sequence characteristics may match the one or more first temporal sequences associated with the first application (e.g., the one or more temporal sequence characteristics may match the one or more first temporal sequences if one or more of a pattern associated with the first sequence of host events is similar to a temporal sequence of the one or more first temporal sequences, time-lengths between host events of the first sequence of host events are similar to a temporal sequence of the one or more first temporal sequences, etc.). For example, it may be determined that the second network traffic is associated with the first application responsive to determining that the one or more temporal sequence characteristics match the one or more first temporal sequences associated with the first application.

Alternatively and/or additionally, a first similarity score may be generated based upon the second network traffic and/or the first set of network traffic information associated with the first application. In some examples, it may be determined that the second network traffic is associated with the first application responsive to determining that the first similarity score meets (and/or is greater than) a similarity score threshold. Alternatively and/or additionally, the first similarity score may be indicative of a probability that the second network traffic is associated with the first application.

In some examples, the first similarity score may be generated based upon a comparison of the one or more sixth hosts associated with the second network traffic with the first set of hosts associated with the first application. Alternatively and/or additionally, the first similarity score may be generated based upon a comparison of one or more host names associated with the one or more sixth hosts with one or more host names associated with the first set of hosts. Alternatively and/or additionally, the first similarity score may be generated based upon a comparison of the first sequence of host events with the one or more first temporal sequences associated with the first application.

Alternatively and/or additionally, the first similarity score may be generated based upon the plurality of sets of coefficients. For example, the first set of coefficients (associated with the first application) may be analyzed based upon the one or more seventh hosts (of the one or more sixth hosts that are comprised within the first set of hosts) to identify one or more first coefficients associated with the one or more seventh hosts. One or more operations (e.g., mathematical operations) may be performed using the one or more first coefficients to generate the first similarity score (e.g., the one or more first coefficients may be combined to generate the first similarity score).

Alternatively and/or additionally, a plurality of similarity scores may be generated based upon the second network traffic and/or the plurality of sets of network traffic information associated with the plurality of applications. For example, a similarity score of the plurality of similarity scores (and/or each similarity score of the plurality of similarity scores) may be associated with the second network traffic and/or an application of the plurality of applications. In some examples, the plurality of similarity scores may be analyzed to determine a highest similarity score of the plurality of similarity scores. It may be determined that the second network traffic is associated with an application of the plurality of applications responsive to determining that a similarity score associated with the application is the highest similarity score of the plurality of similarity scores. For example, it may be determined that the second network traffic is associated with the first application responsive to determining that the first similarity score associated with the first application is the highest similarity score of the plurality of similarity scores.

In some examples, the plurality of user profiles may be analyzed to identify a second user profile associated with the second client device. For example, the plurality of user profiles may be analyzed based upon identification information (e.g., one or more of client device identification information, an IP address, a network identification address associated with a network that the second client device is connected to, etc.) of the second client device to identify the second user profile. For example, the identification information may be determined based upon the second network traffic (e.g., data associated with the second network traffic may comprise the identification information). Alternatively and/or additionally, the second user profile may comprise the identification information. For example, the second user profile may be identified based upon a determination that the identification information matches the second user profile.

Alternatively and/or additionally, the second client device and/or a second user associated with the second client device may be associated with a user account (e.g., an email account, a content platform account, etc.) with the application identification system and/or the content system. For example, the second client device may be logged into the user account (via one or more content interfaces and/or one or more applications). In some examples, the second user profile may comprise an indication of the user account (e.g., the second user profile may comprise a username associated with the user account). The plurality of user profiles may be analyzed based upon the user account (e.g., the username) to identify the second user profile. For example, the user account and/or the username may be determined based upon the second network traffic.

In some examples, responsive to determining that the second network traffic is associated with the first application, the first application may be included in a second set of applications associated with the second user profile. For example, the second user profile may be indicative of the second set of applications (comprising the first application). Alternatively and/or additionally, the second user profile may be indicative of an amount of time that the first application is accessed and/or interacted with using the second client device. For example, responsive to determining that the second network traffic is associated with the first application, the amount of time may be updated based upon the second network traffic. Alternatively and/or additionally, the second user profile may be indicative of a quantity of instances that the first application is opened and/or accessed using the second client device. For example, responsive to determining that the second network traffic is associated with the first application, the quantity of instances may be updated based upon the second network traffic (e.g., the quantity of instances may be incremented).

In some examples, a transmission content item (e.g., one or more of an advertisement, a news article, a video clip, an image, etc.) may be selected for transmission to the second client device based upon the first application (and/or the second set of applications). For example, the transmission content item may be selected based upon a type of application of the first application. In an example, the transmission content item may comprise information associated with a third application associated with the type of application. In an example where the first application is a scheduling application, the transmission content item may comprise information associated with a time-management application.

Alternatively and/or additionally, a request for content associated with the second client device may be received. For example, the request for content may be received from the first client device in association with a request to access a web page associated with the content system and/or a request to access one or more resources associated with the content system. For example, the request for content may be transmitted (to the content system) by the first client device responsive to accessing the web page and/or accessing the one or more resources. Alternatively and/or additionally, the request for content may be received from a server associated with the web page and/or the one or more resources. For example, the request for content may be transmitted (to the content system) by the server responsive to receiving the request to access the web page and/or the request to access the one or more resources.

In some examples, responsive to receiving the request for content associated with the second client device, the transmission content item may be transmitted to the second client device. For example, the transmission content item may be displayed via the web page (e.g., within an advertisement area of the web page).

In some examples, the plurality of sets of network traffic information may undergo a validation process to determine an accuracy and/or a precision of the plurality of sets of network traffic information. For example, the validation process may comprise comparing first application usage information (of the plurality of user profiles) determined using the plurality of sets of network traffic information with analytical information (received from the one or more analytical engines configured to track application usage of applications of the plurality of applications) to determine the accuracy and/or the precision of the plurality of sets of network traffic information.

Alternatively and/or additionally, the validation process may comprise receiving second application usage information from a set of client devices. For example, the second application usage information may be indicative of one or more of times that applications are opened via the set of client devices, times that applications are closed via the set of client devices, times that application sessions are started via the set of client devices, times that application sessions are finished via the set of client devices, etc. In some examples, third application usage information associated with the set of client devices may be determined using the plurality of sets of network traffic information. The validation process may comprise comparing the third application usage information with the second application usage information to determine the accuracy and/or the precision of the plurality of sets of network traffic information.

Alternatively and/or additionally, the validation process may be performed using one or more machine learning techniques associated with validating data. For example, the one or more machine learning techniques may be used to determine the accuracy and/or the precision of the plurality of sets of network traffic information. In some examples, the plurality of sets of network traffic information may be modified based upon the validation process. For example, the plurality of sets of network traffic information may be modified responsive to determining that the accuracy of the plurality of sets of network traffic information does not meet a threshold accuracy and/or responsive to determining that the precision of the plurality of sets of network traffic information does not meet a threshold precision.

Figure 5C:
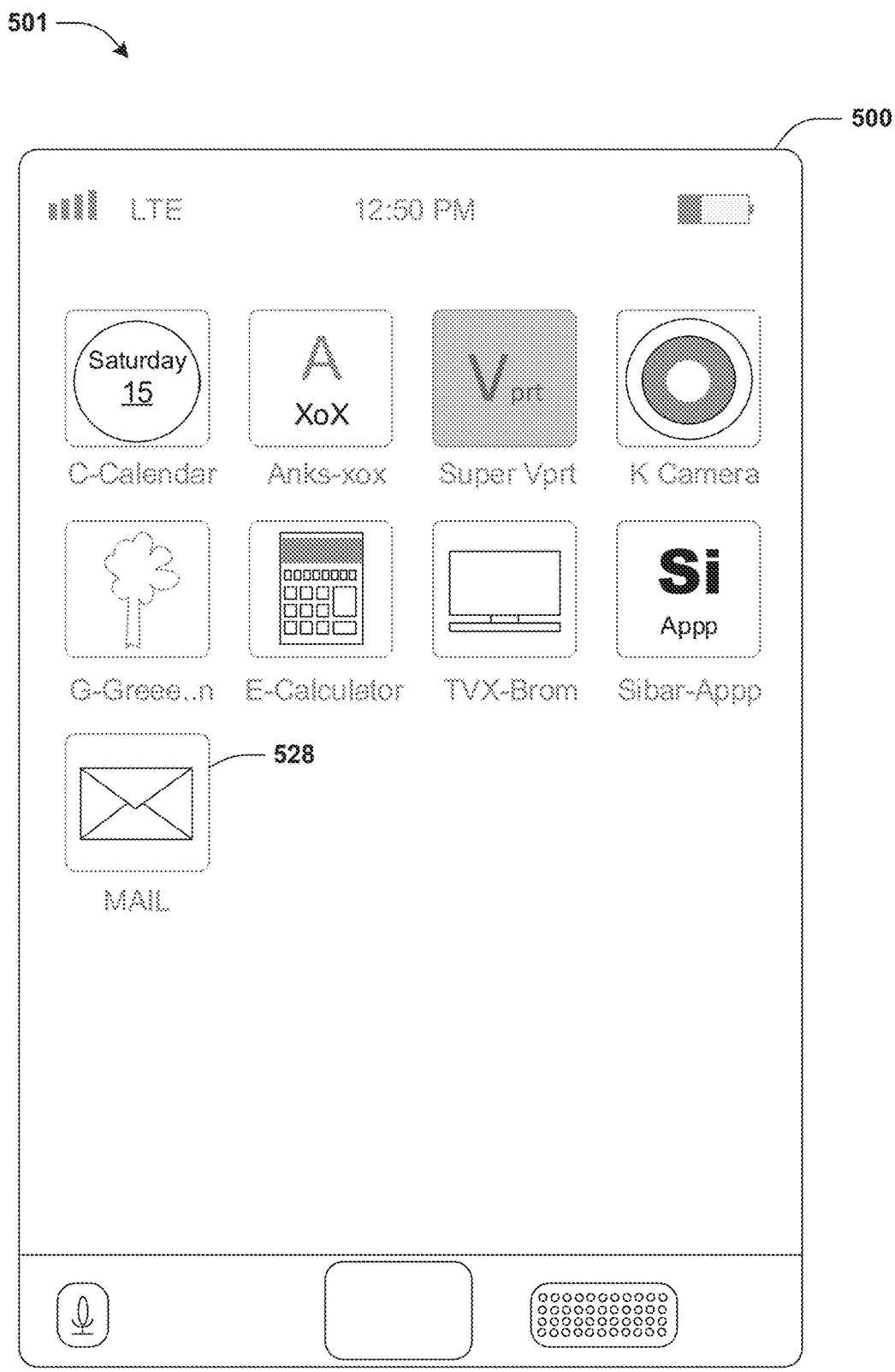
FIG. 5C is a component block diagram illustrating an example system for determining an application associated with network traffic of a client device, where a client device is used to open an email client application.

FIG. 5C illustrates a client device 500 (e.g., the second client device) being used to open an email client application (e.g., the first application). For example, the client device 500 may display a list of application selectable inputs (e.g., the list of application selectable inputs may be displayed within an exemplary home-screen of the client device 500). For example, the list of application selectable inputs may comprise a first selectable input 528 corresponding to the email client application. For example, responsive to a selection of the first selectable input 528, a request to access the email client application may be transmitted by the client device 500 to one or more eighth hosts associated with the email client application and/or the email client application may be opened using the client device 500.

Figure 5D:
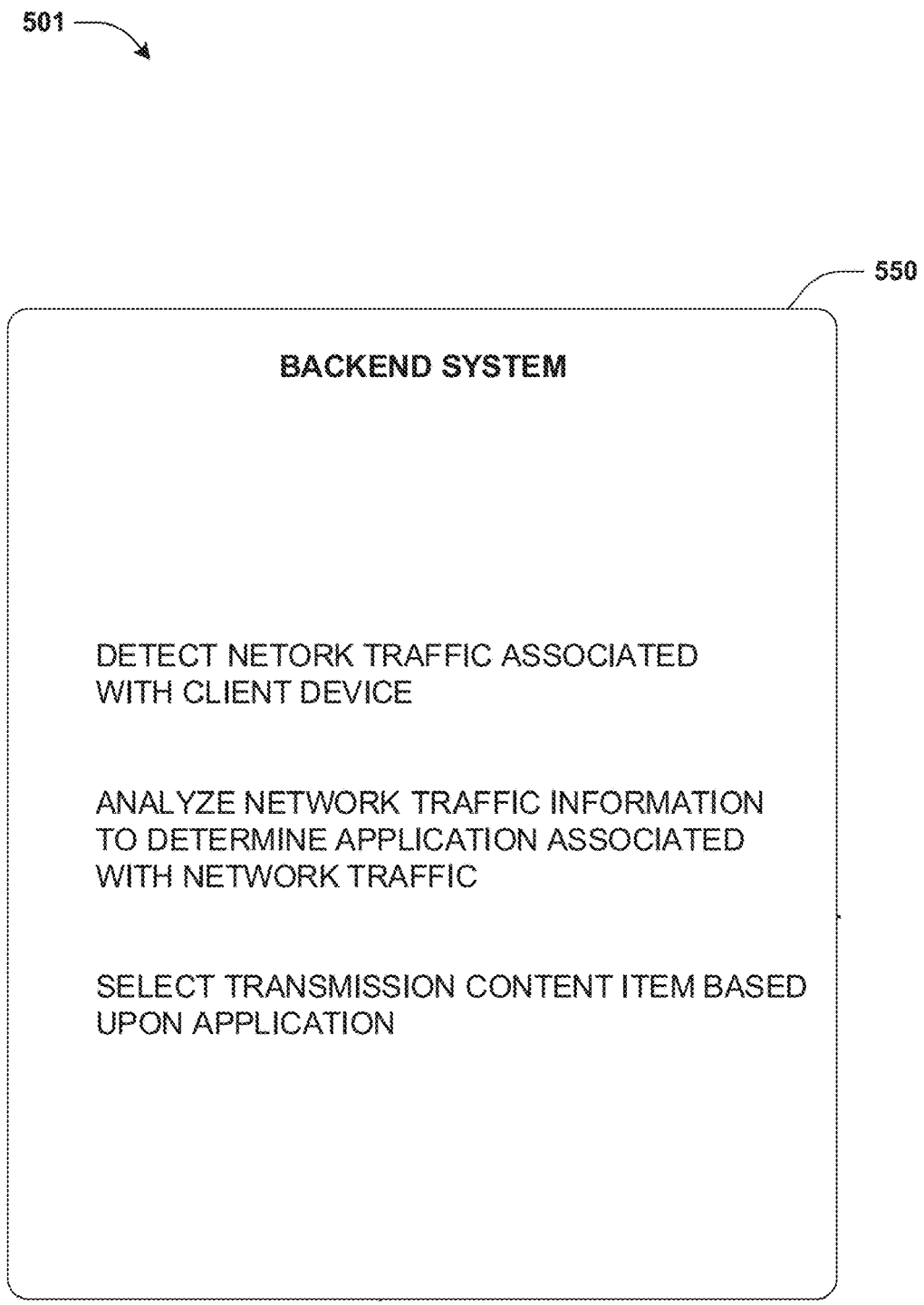
FIG. 5D is a component block diagram illustrating an example system for determining an application associated with network traffic of a client device, where a backend system determines that third network traffic associated with a client device is associated with an email client application.

FIG. 5D illustrates a backend system 550 determining that third network traffic associated with the client device 500 is associated with the email client application. For example, the third network traffic may be detected via one or more of the one or more proxies, the ISP, the packet analyzer, information received from the client device 500, etc. Alternatively and/or additionally, the third network traffic may comprise transmission of the request to access the email client application to the one or more eighth hosts associated with the email client application. In some examples, the plurality of sets of network traffic may be analyzed based upon the third network traffic to determine that the email client application is associated with the third network traffic.

Alternatively and/or additionally, a second transmission content item 542 (illustrated in FIG. 5G) may be selected for transmission to the client device 500 based upon the email client application. For example, it may be determined that the email client application is associated with a second type of application (e.g., email client). Alternatively and/or additionally, the second transmission content item 542 may be selected based upon the second type of application. For example, the second transmission content item 542 may comprise information associated with a second email client application (different than the email client application).

Figure 5E:
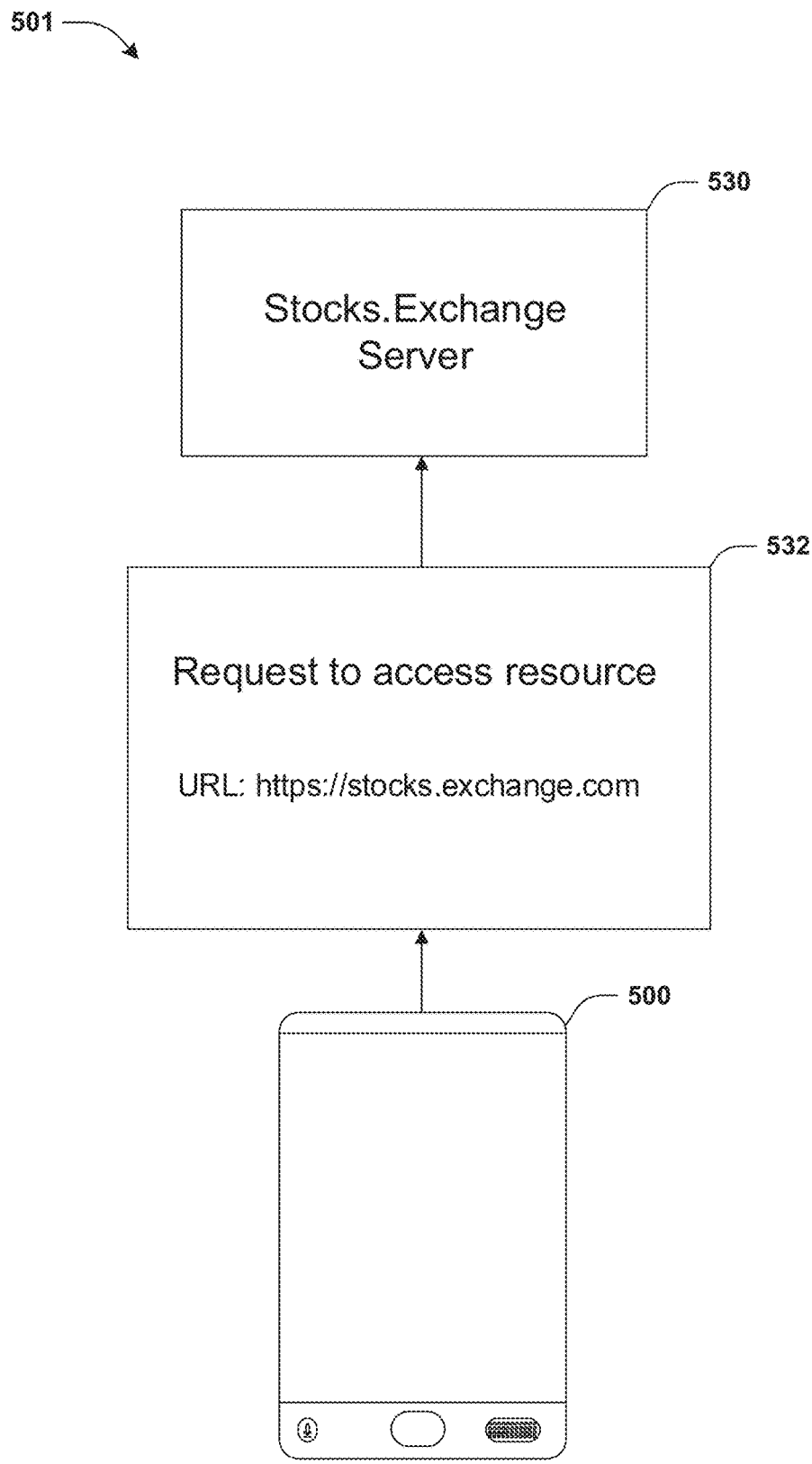
FIG. 5E is a component block diagram illustrating an example system for determining an application associated with network traffic of a client device, where a request to access a resource is transmitted by a client device to a first server.

FIG. 5E illustrates the client device 500 transmitting a request to access a resource 532 to a first server 530. In some examples, the resource may correspond to a web page 540 (illustrated in FIG. 5G). For example, the request to access the resource 532 may be transmitted responsive to a selection of a link to the web page 540. In some examples, the request to access the resource 532 may comprise an indication of the web page 540 (e.g., a web address "https://stocks.exchange.com"). Alternatively and/or additionally, the first server 530 may be associated with the web page 540.

Figure 5F:
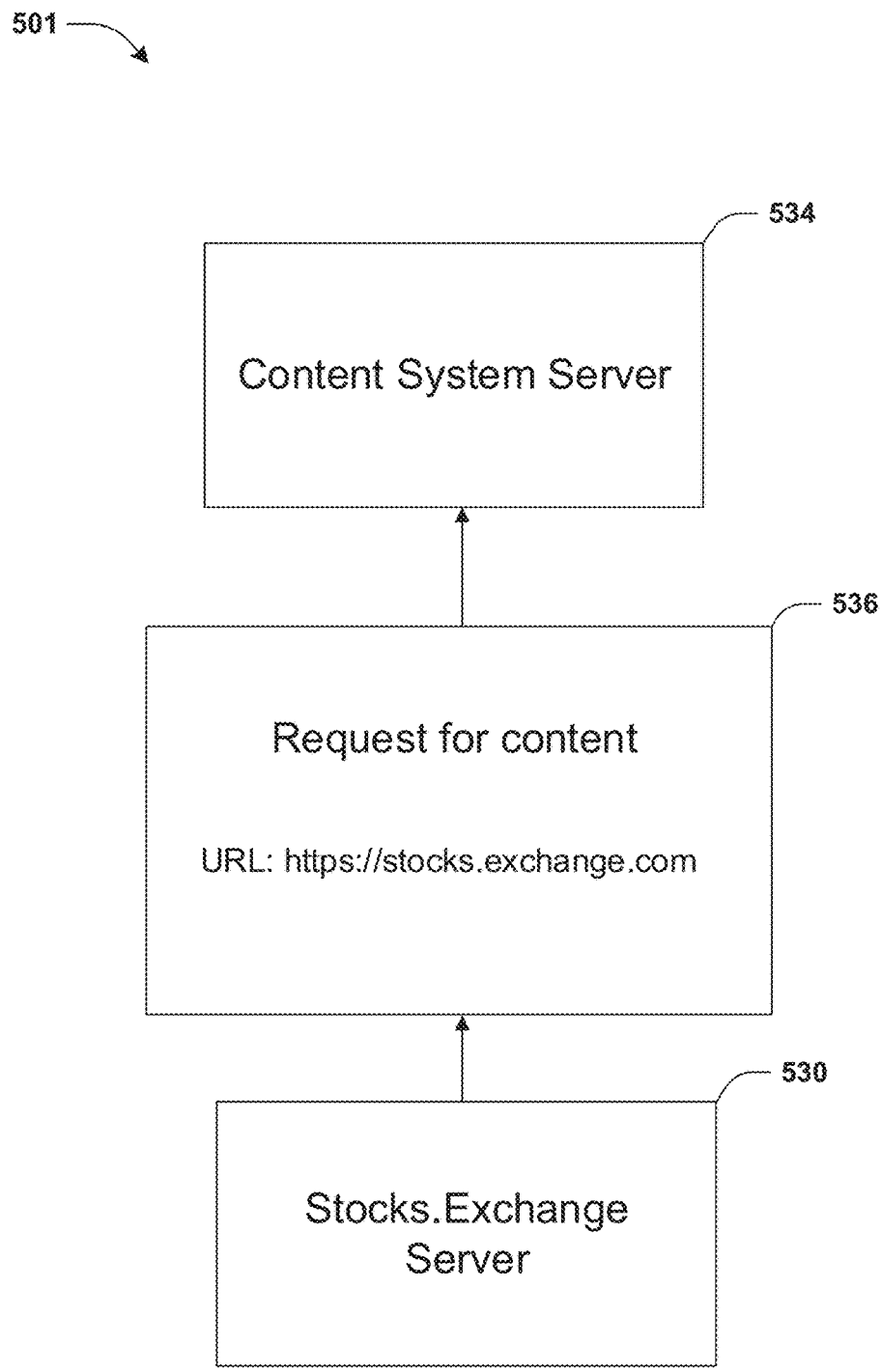
FIG. 5F is a component block diagram illustrating an example system for determining an application associated with network traffic of a client device, where a request for content is transmitted by a first server to a second server.

FIG. 5F illustrates the first server 530 transmitting a request for content 536 to a second server 534 associated with the content system. In some examples, the request for content 536 may be transmitted (by the first server 530) responsive to receiving the request to access the resource 532. Alternatively and/or additionally, the request for content 536 may be transmitted (to the second server 534) by the client device 500. In some examples, the request for content 536 may be a request to be provided with a content item (e.g., one or more of an advertisement, a news article, a video clip, an image, a link, etc.) (for presentation via the web page 540).

Figure 5G:
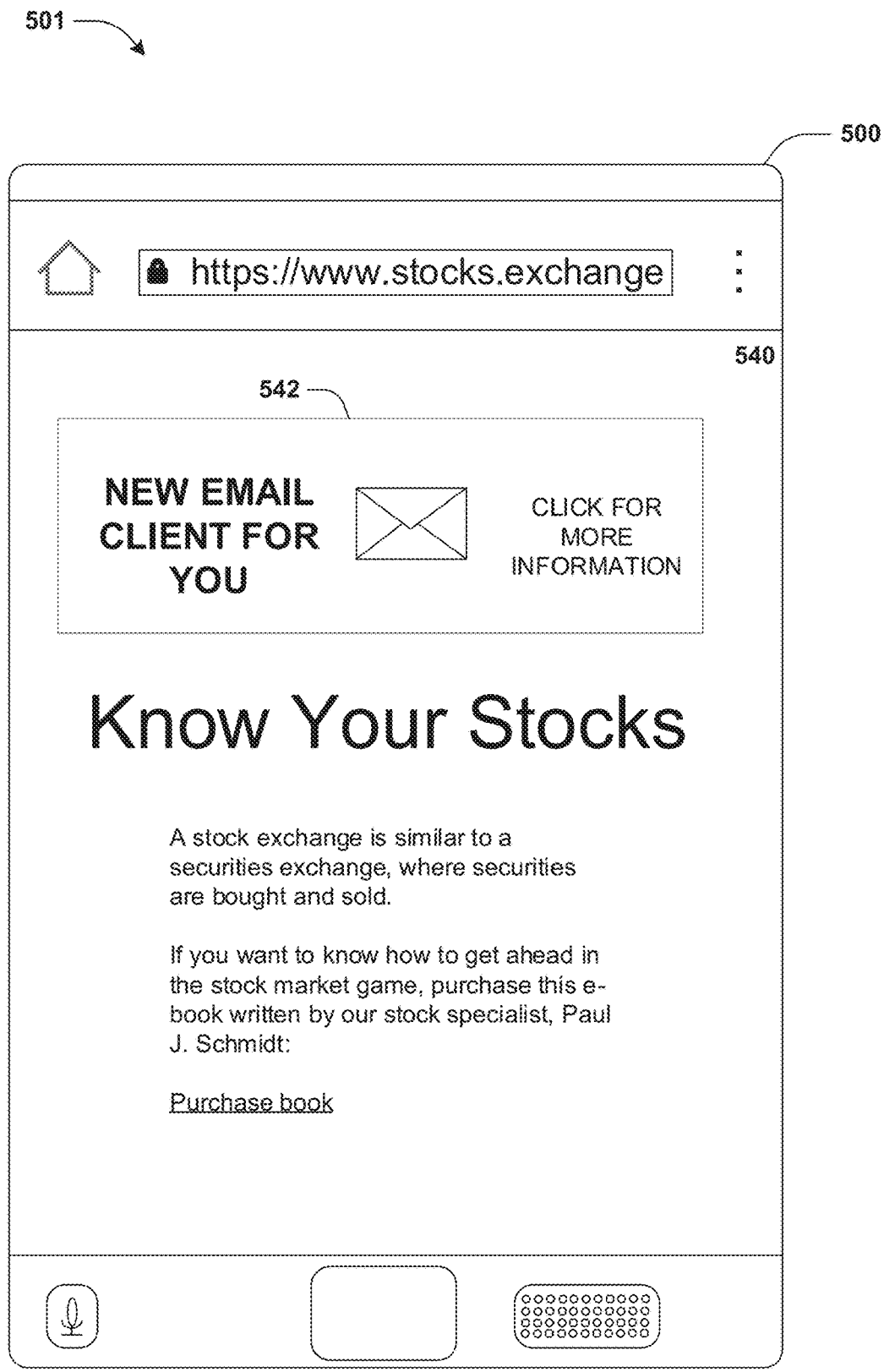
FIG. 5G is a component block diagram illustrating an example system for determining an application associated with network traffic of a client device, where a client device presents and/or accesses a web page using a browser of the client device.

In some examples, the second transmission content item 542 may be transmitted to the client device 500. FIG. 5G illustrates the client device 500 presenting and/or accessing the web page 540 using a browser of the client device 500. For example, the content system may provide the second transmission content item 542 to be presented via the web page 540 while the web page 540 is accessed by the client device 500.

It may be appreciated that the disclosed subject matter may assist a user (and/or a client device associated with the user) in viewing and/or consuming content associated with subject matter that the user has an interest in. Alternatively and/or additionally, the disclosed subject matter may assist in determining application usage information based upon network traffic of a client device.

Implementation of at least some of the disclosed subject matter may lead to benefits including, but not limited to, a reduction in screen space and/or an improved usability of a display (e.g., of the client device) (e.g., as a result of enabling the user to automatically consume content associated with subject matter that the user has an interest in, wherein the user may not view content that the user does not have an interest in, wherein the user may not need to open a separate application and/or a separate window in order to find content having the subject matter that the user has an interest in, etc.).

Alternatively and/or additionally, implementation of at least some of the disclosed subject matter may lead to benefits including a reduction in bandwidth (e.g., as a result of reducing a need for the user to open a separate application and/or a separate window in order to search throughout the internet and/or navigate through internet content to find content that the user has an interest in).

Alternatively and/or additionally, implementation of at least some of the disclosed subject matter may lead to benefits including more accurate and precise transmission of content to intended users (e.g., as a result of automatically determining applications accessed by users via client devices, as a result of transmitting content to a client device associated with a user based upon a set of applications accessed and/or interacted with using the client device, etc.).

Alternatively and/or additionally, implementation of at least some of the disclosed subject matter may lead to benefits including a faster identification of content to be transmitted and/or faster loading of the content on a receiving device. For example, by using user profiles, sets of host information, network traffic information data structures, vector representations, machine learning models, similarity scores and/or user profiles as provided for herein, accurate content can be identified at an increased speed, and thus delay between receiving a request for content and transmission of the content and/or displaying of the content can be reduced.

In some examples, at least some of the disclosed subject matter may be implemented on a client device, and in some examples, at least some of the disclosed subject matter may be implemented on a server (e.g., hosting a service accessible via a network, such as the Internet).

Figure 6:
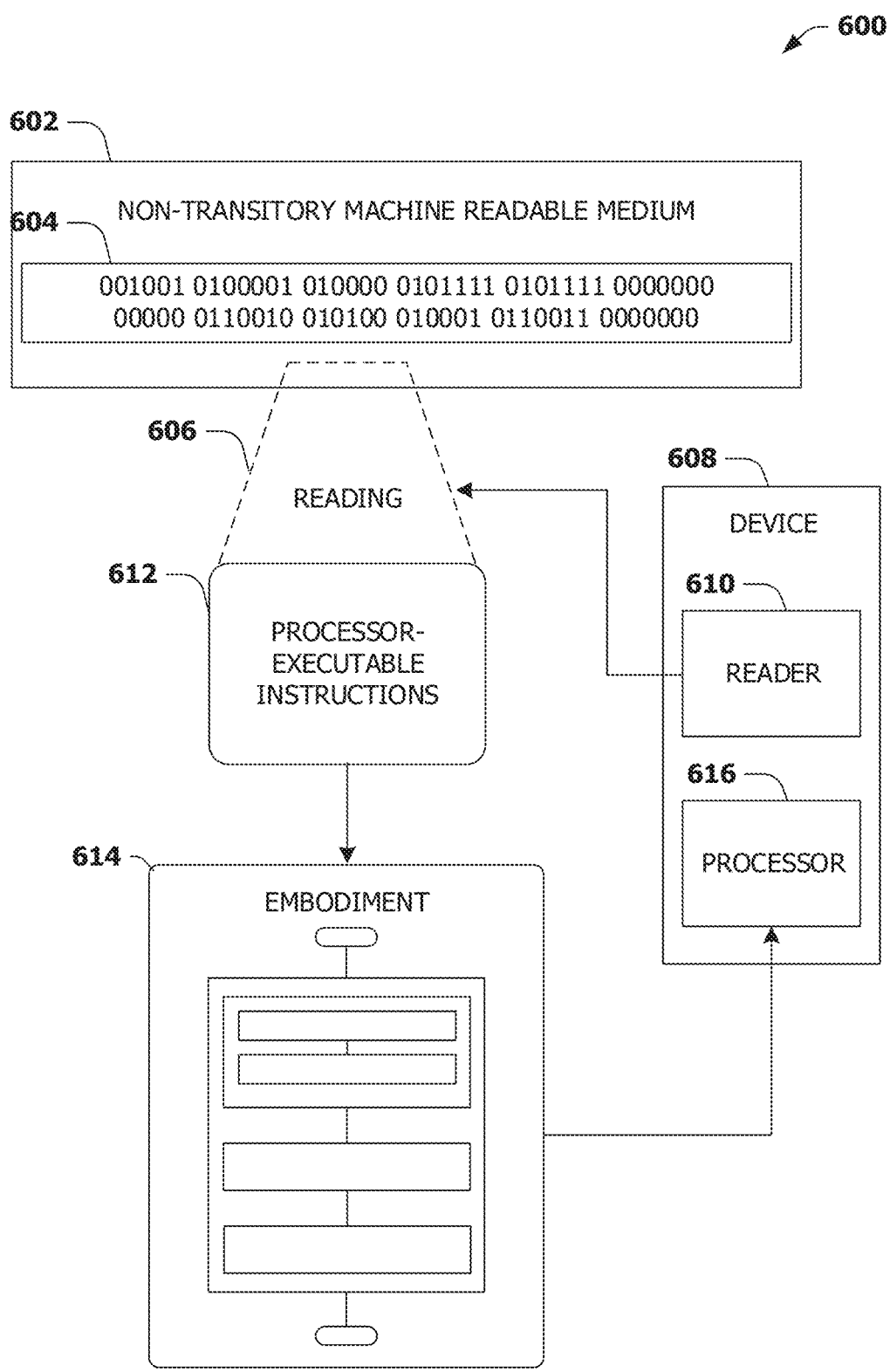
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein (e.g., embodiment 614). The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed, cause performance of operations, such as at least some of the example method 400 of FIG. 4, for example. In some embodiments, the processor-executable instructions 612 are configured to cause implementation of a system, such as at least some of the exemplary system 501 of FIGS. 5A-5G, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
monitoring activity of one or more client devices to detect one or more sets of network traffic, wherein a set of network traffic of the one or more sets of network traffic comprises at least one of:
transmission of data by a first client device of the one or more client devices to one or more first hosts; or
reception of data by the first client device from one or more second hosts;
analyzing the one or more sets of network traffic to generate a set of network traffic information associated with a first application, wherein the set of network traffic information is indicative of a first set of hosts associated with the first application, wherein the analyzing the one or more sets of network traffic comprises clustering a plurality of hosts associated with the one or more sets of network traffic into one or more sets of hosts associated with one or more applications, wherein the clustering comprises responsive to determining that a first host is associated with multiple applications comprising the first application and a second application, not including the first host in the first set of hosts;
detecting first network traffic associated with a second client device; and
determining that the first network traffic is associated with the first application based upon the first network traffic and the set of network traffic information associated with the first application.

2. The method of claim 1, wherein:
a set of hosts of the one or more sets of hosts is associated with an application of the one or more applications;
the one or more sets of hosts comprise the first set of hosts; and
the one or more applications comprise the first application.

3. The method of claim 2, wherein the clustering the plurality of hosts associated with the one or more sets of network traffic into the one or more sets of hosts is performed based upon:
one or more temporal sequences of host events of the one or more sets of network traffic, wherein a host event of the host events corresponds to at least one of data transmission to a second host by a third client device or data reception from a third host by a fourth client device.

4. The method of claim 3, comprising:
determining a set of quantities of host events associated with the first set of hosts, wherein:
a quantity of host events of the set of quantities of host events corresponds to host events, that occur in association with the first application, associated with a host of the first set of hosts; and
the set of network traffic information is indicative of the set of quantities of host events.

5. The method of claim 2, wherein the clustering the plurality of hosts associated with the one or more sets of network traffic into the one or more sets of hosts is performed based upon:
host names associated with the plurality of hosts.

6. The method of claim 1, wherein the determining that the first host is associated with the first application and the second application is performed based upon a comparison of a first quantity of client devices of a first plurality of client devices associated with at least one of data reception from the first host or data transmission to the first host during a first period of time and a second quantity of client devices of a second plurality of client devices associated with accessing the first application during the first period of time.

7. The method of claim 1, wherein the determining that the first network traffic is associated with the first application is performed based upon a determination that a host associated with the first network traffic is comprised within the first set of hosts.

8. The method of claim 3, wherein:
the set of network traffic information is indicative of one or more first temporal sequences associated with the first application and the first set of hosts; and
the determining that the first network traffic is associated with the first application is performed based upon a determination that a sequence of host events associated with the first network traffic matches a temporal sequence of the one or more first temporal sequences.

9. The method of claim 1, comprising:
generating a similarity score based upon the first network traffic and the set of network traffic information associated with the first application, wherein the determining that the first network traffic is associated with the first application is performed based upon a determination that the similarity score meets a similarity score threshold.

10. The method of claim 9, wherein the similarity score is indicative of a probability that the first network traffic is associated with the first application.

11. The method of claim 1, comprising:
selecting a transmission content item for transmission to the second client device based upon the first application.

12. The method of claim 11, comprising:
responsive to receiving a request for content associated with the second client device, transmitting the transmission content item to the second client device.

13. A computing device comprising:
a processor; and
memory comprising processor-executable instructions that when executed by the processor cause performance of operations, the operations comprising:
monitoring activity of one or more client devices to detect one or more sets of network traffic, wherein a set of network traffic of the one or more sets of network traffic comprises at least one of:
transmission of data by a first client device of the one or more client devices to one or more first hosts; or
reception of data by the first client device from one or more second hosts;
analyzing the one or more sets of network traffic to generate a set of network traffic information associated with a first application, wherein the set of network traffic information is indicative of a first set of hosts associated with the first application, wherein the analyzing the one or more sets of network traffic comprises clustering a plurality of hosts associated with the one or more sets of network traffic into one or more sets of hosts associated with one or more applications, wherein the clustering is based upon a comparison of a first quantity of client devices of a first plurality of client devices associated with at least one of data reception from a first host or data transmission to the first host during a first period of time and a second quantity of client devices of a second plurality of client devices associated with accessing the first application during the first period of time;

detecting first network traffic associated with a second client device; and determining that the first network traffic is associated with the first application based upon the first network traffic and the set of network traffic information associated with the first application.

14. The computing device of claim 13, wherein:

a set of hosts of the one or more sets of hosts is associated with an application of the one or more applications;

the one or more sets of hosts comprise the first set of hosts; and the one or more applications comprise the first application.

15. The computing device of claim 14, wherein the clustering the plurality of hosts associated with the one or more sets of network traffic into the one or more sets of hosts is performed based upon at least one of:

one or more temporal sequences of first host events of the one or more sets of network traffic, wherein a host event of the first host events corresponds to at least one of data transmission to a second host by a third client device or data reception from a third host by a fourth client device; or host names associated with the plurality of hosts.

16. The computing device of claim 15, the operations comprising:

determining a set of quantities of host events associated with the first set of hosts, wherein:

a quantity of host events of the set of quantities of host events corresponds to host events, that occur in association with the first application, associated with a host of the first set of hosts; and the set of network traffic information is indicative of the set of quantities of host events.

17. A non-transitory machine readable medium having stored thereon processor-executable instructions that when executed cause performance of operations, the operations comprising:

monitoring activity of one or more client devices to detect one or more sets of network traffic, wherein a set of network traffic of the one or more sets of network traffic comprises at least one of:

transmission of data by a first client device of the one or more client devices to one or more first hosts; or reception of data by the first client device from one or more second hosts;

analyzing the one or more sets of network traffic to generate a set of network traffic information associated with a first application, wherein the set of network traffic information is indicative of a first set of hosts associated with the first application, wherein the analyzing the one or more sets of network traffic comprises:

clustering a plurality of hosts associated with the one or more sets of network traffic into one or more sets of hosts associated with one or more applications, wherein:

a set of hosts of the one or more sets of hosts is associated with an application of the one or more applications;

the one or more sets of hosts comprise the first set of hosts; and the one or more applications comprise the first application;

the clustering comprises responsive to determining that a first host is associated with the first application and a second application, not including the first host in the one or more sets of hosts; and the determining that the first host is associated with the first application and the second application is performed based upon a comparison of a first quantity of client devices of a first plurality of client devices associated with at least one of data reception from the first host or data transmission to the first host during a first period of time and a second quantity of client devices of a second plurality of client devices associated with accessing the first application during the first period of time;

detecting first network traffic associated with a second client device; and determining that the first network traffic is associated with the first application based upon the first network traffic and the set of network traffic information associated with the first application.

18. The non-transitory machine readable medium of claim 17, wherein the clustering the plurality of hosts associated with the one or more sets of network traffic into the one or more sets of hosts is performed based upon:

host names associated with the plurality of hosts.

19. The non-transitory machine readable medium of claim 17, wherein the clustering the plurality of hosts associated with the one or more sets of network traffic into the one or more sets of hosts is performed based upon:

one or more temporal sequences of first host events of the one or more sets of network traffic, wherein a host event of the first host events corresponds to at least one of data transmission to a second host by a third client device or data reception from a third host by a fourth client device.

20. The non-transitory machine readable medium of claim 19, the operations comprising:

determining a set of quantities of host events associated with the first set of hosts, wherein:

a quantity of host events of the set of quantities of host events corresponds to host events, that occur in association with the first application, associated with a host of the first set of hosts; and the set of network traffic information is indicative of the set of quantities of host events.

* * * * *